(12) United States Patent  
Zohar et al.

(10) Patent No.: US 12,136,422 B2
(45) Date of Patent: Nov. 5, 2024

(54) AUTOMATICALLY EXECUTING OPERATIONS SEQUENCES WITH CLICKABLE ELEMENTS

(71) Applicant: WALKME LTD., Tel Aviv (IL)

(72) Inventors: Ron Zohar, Givatayim (IL); Moran Shemer, Herzliya (IL)

(73) Assignee: WALKME LTD., Tel Aviv (IL)

( * ) Notice: Subject to any disclaimer, the term of this patent is extended or adjusted under 35 U.S.C. 154(b) by 0 days.

(21) Appl. No.: 17/962,505

(22) Filed: Oct. 9, 2022

(65) Prior Publication Data

US 2023/0038243 A1 Feb. 9, 2023

Related U.S. Application Data

(60) Continuation of application No. 16/989,917, filed on Aug. 11, 2020, now Pat. No. 11,501,774, which is a continuation of application No. 15/904,367, filed on Feb. 25, 2018, now Pat. No. 10,777,194, which is a division of application No. 14/860,733, filed on Sep. 22, 2015, now Pat. No. 9,934,782.

(51) Int. Cl.
| | |
|---|---|
| *G06F 40/35* | (2020.01) |
| *G06F 3/16* | (2006.01) |
| *G10L 13/02* | (2013.01) |
| *G10L 15/22* | (2006.01) |
| *G10L 15/26* | (2006.01) |

(52) U.S. Cl.
CPC .............. *G10L 15/22* (2013.01); *G06F 3/167* (2013.01); *G10L 13/02* (2013.01); *G10L 15/26* (2013.01); *G10L 2015/223* (2013.01)

(58) Field of Classification Search
CPC ....... G10L 15/00; G10L 15/06; G10L 15/065; G10L 15/08; G10L 15/183; G10L 15/22; G10L 15/26; G06F 40/35; G06F 40/10; G06F 40/106; G06F 40/20; G06F 40/216
USPC ........ 704/270, 275, 272, 235, 231, 251, 255
See application file for complete search history.

(56) References Cited

U.S. PATENT DOCUMENTS

| | | | | |
|---|---|---|---|---|
| 2005/0010892 A1* | 1/2005 | McNair | ..................... | G06F 8/38 717/100 |
| 2015/0178348 A1* | 6/2015 | Rohde | ................. | G06F 16/2379 707/734 |
| 2015/0243288 A1* | 8/2015 | Katsuranis | .............. | G06F 9/451 715/764 |

* cited by examiner

*Primary Examiner* — Qi Han
(74) *Attorney, Agent, or Firm* — The Law Office of Joseph L. Felber

(57) ABSTRACT

Method, system and product for automatic execution of operations sequences. An operations sequence, which includes a first operation and a second operation, is obtained. The operations sequence comprises at least one user interaction that includes clicking on a clickable element. The operations sequence or portion thereof is automatically executed by mimicking user interactions with the GUI, as indicated in the operations sequence, including by automatically clicking on the clickable element.

20 Claims, 10 Drawing Sheets

AUTOMATICALLY EXECUTING OPERATIONS SEQUENCES WITH CLICKABLE ELEMENTS

CROSS-REFERENCE TO RELATED APPLICATIONS

This application is a continuation and claims the benefit of U.S. non-provisional application Ser. No. 16/989,917 filed Aug. 11, 2020, entitled "AUTOMATICALLY EXECUTING OPERATIONS SEQUENCES", which is a continuation of U.S. non-provisional application Ser. No. 15/904,367 filed Feb. 25, 2018, entitled "AUTOMATIC PERFORMANCE OF USER INTERACTION OPERATIONS ON A COMPUTING DEVICE", now U.S. Pat. No. 10,777,194, which is a divisional of U.S. non-provisional application Ser. No. 14/860,733 filed Sep. 22, 2015, entitled "AUTOMATIC PERFORMANCE OF USER INTERACTION OPERATIONS ON A COMPUTING DEVICE", now U.S. Pat. No. 9,934,782, all of which are hereby incorporated by reference in their entirety without giving rise to disavowment.

TECHNICAL FIELD

The present disclosure relates to user operation of computing devices in general, and to automatic performance of user interaction operations on a computing device, in particular.

BACKGROUND

Computing devices for personal use have become more and more ubiquitous in the last few decades. This trend of increasingly widespread use was further boosted in recent years with the advent of mobile platforms, such as Personal Digital Assistants (PDAs), hand-held computers, and computerized mobile phones running a full-fledged operating system, commonly known as "smartphones". These devices typically have general-purpose processors, memory and storage that provide users with computing power nearly on par with that of desktop computers. Additional prevalent features include connectivity to various communications networks and other devices, e.g., Wireless Local Area Networks (WLANs), cellular networks, Near Field Communication (NFC), etc., and one or more types of sensors, such as cameras, microphones, accelerometers, Global Positioning System (GPS) receivers, and the like.

Many mobile computing devices include a touch-sensitive display (also known as a "touch screen") with a Graphical User Interface (GUI) serving as the main form of user interaction. The user interacts with the GUI primarily through finger contacts and gestures on the touch-sensitive display. Thus, operating the mobile device and its different functionalities can prove difficult or even impossible when one or both of the user's hands are occupied or when the user is unable to look at the display screen, whether for intermittent periods or at all. This situation commonly occurs when the user is driving a vehicle, for example. In a 2014 interview, Larry Page, Google's CEO and co-founder, addressed this issue: "We still feel computers are pretty bad. You're messing around, you're scrolling on your touchscreen phone. You're in a car and it's bouncy and it doesn't really work". In this scenario it is evident that some form of voice control is desirable. In recent years, with the introduction of the "Virtual Assistant" such as Siri™, Cortana™ and Google Now™, a significant stride has been made towards this reality as voice recognition improved significantly.

As humans are creatures of habit, and as many computing devices share common features and functionalities between them, usage of computing devices can exhibit great regularity and repetitive patterns, such that the same operations or sequences of operations are frequently performed by a user or a plurality of users.

BRIEF SUMMARY

One exemplary embodiment of the disclosed subject matter is a computer-implemented method performed by a computing device operated by a user, wherein said computer-implemented method comprising: obtaining an identifier of an operations sequence comprising one or more operations, each operation representing a user interaction with an element of a user interface for operating a computing device; obtaining the operations sequence, wherein obtaining comprises searching a repository of operations sequences using the identifier to obtain the operations sequence, wherein the repository of operation sequences comprises operations sequences defined based on a previous execution of one or more operations by another computing device other than the computing device on behalf of another user other than the user; and automatically executing the operations sequence or portion thereof on the computing device.

Another exemplary embodiment of the disclosed subject matter is a computerized apparatus having a processor, the processor being adapted to perform the steps of: obtaining an identifier of an operations sequence comprising one or more operations, each operation representing a user interaction with an element of a user interface for operating a computing device; obtaining the operations sequence, wherein obtaining comprises searching a repository of operations sequences using the identifier to obtain the operations sequence, wherein the repository of operation sequences comprises operations sequences defined based on a previous execution of one or more operations by another computing device other than the computing device on behalf of another user other than the user; and automatically executing the operations sequence or portion thereof on the computing device.

Yet another exemplary embodiment of the disclosed subject matter is a computer program product comprising a computer readable storage medium retaining program instructions, which program instructions when read by a processor, cause the processor to perform a method comprising: obtaining an identifier of an operations sequence comprising one or more operations, each operation representing a user interaction with an element of a user interface for operating a computing device; obtaining the operations sequence, wherein obtaining comprises searching a repository of operations sequences using the identifier to obtain the operations sequence, wherein the repository of operation sequences comprises operations sequences defined based on a previous execution of one or more operations by another computing device other than the computing device on behalf of another user other than the user; and automatically executing the operations sequence or portion thereof on the computing device.

Yet another exemplary embodiment of the disclosed subject matter is a computer-implemented method comprising: determining one or more interactive elements in a layout of a Graphical User Interface (GUI) displayed by a computing device; assigning a label to each of the one or more interactive elements, wherein the label is unique in the layout; displaying in visible proximity to each of the one or more interactive elements the assigned label; recognizing speech by a user vocally indicating a selected element of the one or more interactive elements by referring to the label assigned to the selected element; and, automatically performing a user interaction operation on the selected element.

Yet another exemplary embodiment of the disclosed subject matter is a computerized apparatus having a processor, the processor being adapted to perform the steps of: determining one or more interactive elements in a layout of a Graphical User Interface (GUI) displayed by a computing device; assigning a label to each of the one or more interactive elements, wherein the label is unique in the layout; displaying in visible proximity to each of the one or more interactive elements the assigned label; recognizing speech by a user vocally indicating a selected element of the one or more interactive elements by referring to the label assigned to the selected element; and, automatically performing a user interaction operation on the selected element.

Yet another exemplary embodiment of the disclosed subject matter is a computer program product comprising a computer readable storage medium retaining program instructions, which program instructions when read by a processor, cause the processor to perform a method comprising: determining one or more interactive elements in a layout of a Graphical User Interface (GUI) displayed by a computing device; assigning a label to each of the one or more interactive elements, wherein the label is unique in the layout; displaying in visible proximity to each of the one or more interactive elements the assigned label; recognizing speech by a user vocally indicating a selected element of the one or more interactive elements by referring to the label assigned to the selected element; and, automatically performing a user interaction operation on the selected element.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
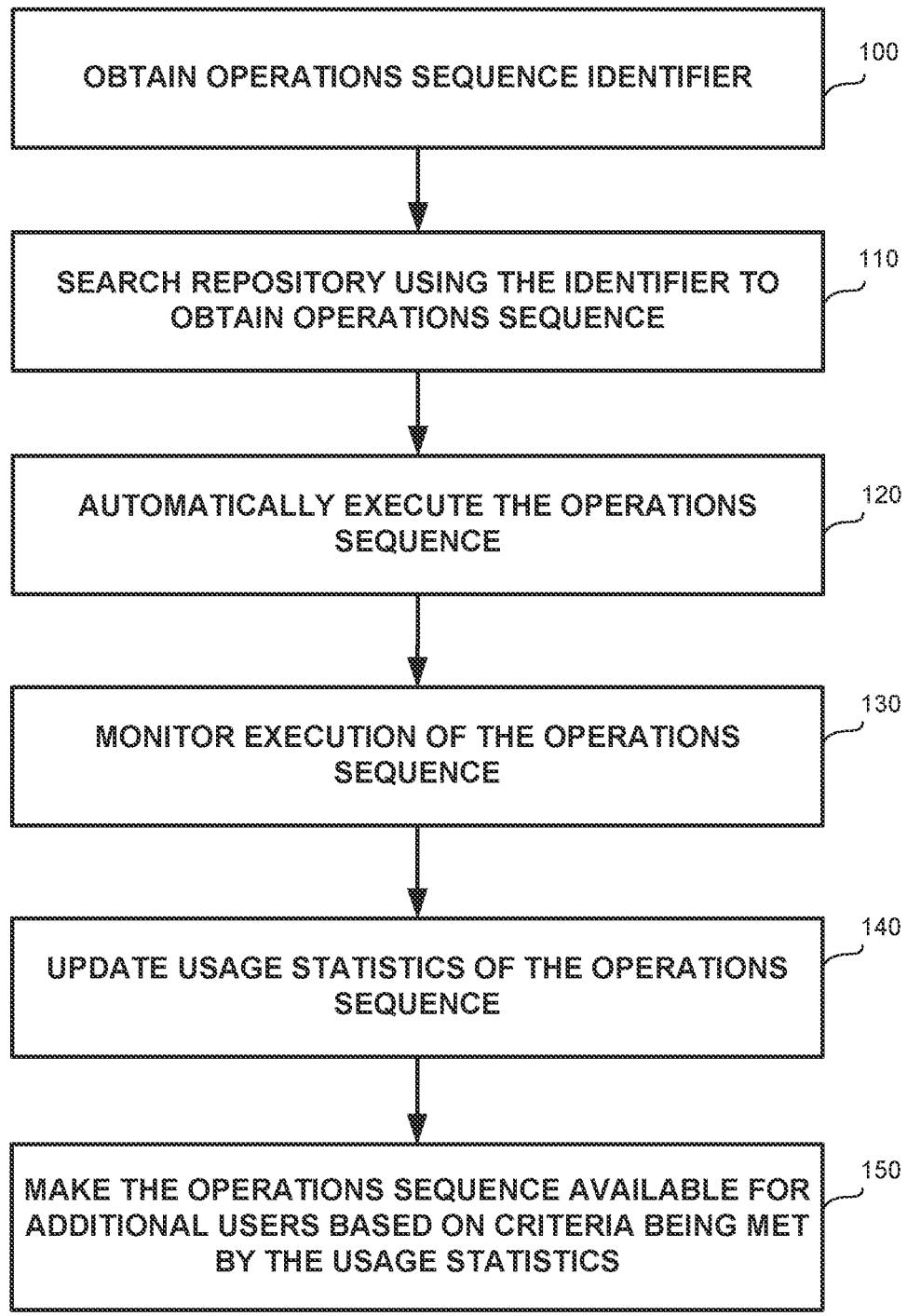
FIG. 1 shows a flowchart diagram of a method, in accordance with some exemplary embodiments of the subject matter.

One technical problem dealt with by the disclosed subject matter is to provide for recording of sequences of user interaction operations performed by a user of a computing device and automatically playing (e.g., "executing") on demand previously recorded sequences, whether recorded by the same computing device of the same user or by another computing device of another user.

Another technical manner dealt with by the disclosed subject matter is to provide for execution of operations sequences so as to achieve the same end-result of the sequence even in cases where as-is execution is not possible. In some exemplary embodiments, execution of a sequence as-is may not be possible, due, for example, to a different initial state of the device or in view of certain modes of operation of software components different than the mode which was exhibited when the sequence was recorded.

Yet another technical problem dealt with by the disclosed subject matter is to allow for switching a computing device to a desired target state from any origin state automatically by demand.

Yet another technical problem dealt with by the disclosed subject matter is to extend a Graphical User Interface (GUI) of a computing device with voice activation capabilities.

Yet another technical problem dealt with by the disclosed subject matter is to provide a full natural voice control interface for a computerized device. The disclosed subject matter may enable a more natural interaction between people and computers thus helping people to get things done with computers more easily.

While virtual assistants are useful for getting answers to questions based on Internet databases, they can perform a very limited set of tasks on the computing device, far from the promise of full natural voice control of the device. The prior art requires manual development of an Application Programming Interface (API) for each desired voice-activated command, which is a tedious, expensive and a non-scalable task. Furthermore, the end users of the application are unaware which voice commands are supported and which are not, and since most functionalities cannot be obtained using voice alone, users resort to manual execution of most actions, even while driving. A 2014 study teaches that while 98% believe that it is dangerous to be texting while driving, 74% admit to do this.

Automatic execution of a required task on a computing device may be desirable in a variety of non-driving conditions as well. Using a single command to execute a task that requires several steps can save time and effort. Using a voice command is a practical solution for interaction with a smart phone, using a smart watch, or interacting without being required to take out the device and type or otherwise interacting using one's hands. Additionally, it can also be very useful for the visually impaired. Furthermore, in some cases, while the user can word the task she wants to perform, she may not know how to fulfill the task on her computing device. For example, a person may wish to add a phone number to an existing contact, but may not know how to execute this on her smart phone. In this case saying or writing "Add number X to contact Y" would be far easier than manually finding the contacts application, finding the relevant contact, pressing the edit button, inputting the number and confirming the addition.

One technical solution is to maintain a repository of operations sequences previously executed by a computing device on behalf of a user and being retrievable for automatic execution on another computing device on behalf of another user using an identifier of the respective operations sequence, wherein each of the operations sequences comprises one or more operations, wherein each operation represents a user interaction with an element of a user interface for operating the computing device. In some exemplary embodiments, the repository may be accessible by and shared among a plurality of computing devices of different users.

In some exemplary embodiments, the user interface may be concealed from the user by an alternative display being displayed while the operations sequence or portion thereof is being automatically executed, such that at least a portion of the one or more elements of the user interface with which user interactions are performed is not visible to the user during that time. The alternative display may be a splash screen indicating execution is performed. Additionally or alternatively, the alternative display may be a screenshot of the display when a sequence execution was initiated, thereby providing a "freeze screen" look-and-feel while the sequence is being executed. In some exemplary embodiments, the alternative display may comprise animation, such as an hourglass, a spinning element, or the like to indicate that the execution of the sequence is ongoing.

In some exemplary embodiments, the user interaction represented by an operation of an operations sequence may be any one of user interactions employed by user interfaces of computing devices, such as: click, scroll, slide, drag, point, input or edit text, and the like. Additionally or alternatively, the user interaction may be a custom action adapted for hands-off operation, such as: read text aloud, designate coordinates of a tabulated area on a display screen (e.g. zoom in into a partial portion of a picture), and the like.

In some exemplary embodiments, the repository may comprise at least one recorded operations sequence recorded while being performed by a user and associated with an identifier provided by that user. In some exemplary embodiments, the user may record the operations sequence explicitly by providing a recordation command prior to commencement of the recording. The association of the recorded operations sequence with the identifier and storage thereof in the repository may be initiated by the user recording the recorded operations sequence, such as using a recordation command Additionally or alternatively, the operations sequence may be recorded based on monitoring of user's execution of one or more operations without the user explicitly initiating the recordation. The user may be prompted to provide the identifier in response to the recorded operations sequence being automatically recognized as being frequently performed.

In some exemplary embodiments, the repository may retain for the operations sequence a plurality of different identifiers. Different identifiers may be defined based on different executions of the operations sequence by different users. Additionally or alternatively, the same user may provide multiple identifiers for the same sequence. In some exemplary embodiments, the alternative identifiers may be identifiers in different languages. Additionally or alternatively, the alternative identifiers may be identifiers in the same language. As an example, one user may define a sequence using the user-defined command "open SMS", another may provide for the same sequence the user-defined command "start SMS", while another may use the user-defined command "text message" for the same sequence.

In some exemplary embodiments, the identifier may be obtained by obtaining a vocal command of a user and extracting the identifier from the vocal command In some exemplary embodiments, the vocal command may be analyzed using a speech to text engine to provide a corresponding string which may be analyzed to extract the identifier. In some exemplary embodiments, commonly used words appearing in the string such as conjunctions ("and", "for", etc.) or other similar terms, may be omitted when defining the identifier. Additionally or alternatively, the identifier may be defined based on a non-vocal command by the user such as a string "record sequence open sesame" which is inputted by the user, where "open sesame" may be the identifier itself or a string from which the identifier is extracted. The user command may be provided either prior to the performance of the operations to be monitored and recorded, or after such operations were executed and monitored by the system.

In some exemplary embodiments, the identifier may comprise a parameter, such that the operations sequence is modified based on a value specified for the parameter. For example, the identifier itself may comprise a base identifier and a parameter, such as a value of or a reference relating to an item from a collection that is interacted with during the execution of the operations sequence. As an example, the identifier may be "voip s Suzanne Vega", where Suzanne Vega is a reference relating to a contact in the address book. The relevant sequence may be configured to open a Voice over IP (VoIP) application, such as Viber™, Skype™, or the like, reach the address book, pick the contact person based on the parameter, and initiate a call with the selected contact person. Hence, the command "voip Mick Jagger", would be configured to operate similarly without having to be explicitly defined for Mick Jagger as a contact person.

In some exemplary embodiments, usage statistics for each of the operations sequences and respective associated identifiers retained in the repository may be collected. The usage statistics may account for executions of an identical operations sequence by additional users as well as for executions of similar ones, e.g., partially overlapping sequences. The retained operations sequences may be made accessible selectively based on usage criteria indicated as being met by the usage statistics. For example, an operations sequence newly introduced into the repository may be made at first only privately accessible to the originating user, and only after being executed independently for as many number of times and/or by as many number of different users as of a predetermined threshold, being made publicly accessible. Additionally or alternatively, the usage statistics may be employed for maintenance of the repository, for example, by detecting and removing operations sequences or redundant identifiers that are seldom used, if at all. Additionally or alternatively, usage statistics may utilized for determining likelihood of successful execution of an operation sequence.

In some exemplary embodiments, the automatic execution of an operations sequence may involve making a determination of whether or not an element required for performing a current operation is available for user interaction in a current state of the computing device. An intermediary operations sequence configured to cause the computing device to switch from the current state to a target state in which the element is available for user interaction may be obtained and performed to allow automatic execution of the current operation.

In the context of the present disclosure, the term "state" with relation to a state of the computing device may refer to an ensemble of one or more elements comprised in a layout of a screen display being displayed by the computing device. The term may also refer to an application program and a respective ensemble display of the one or more ensemble displays provided thereby. For example, an application program for exchanging and managing e-mail communications may comprise displays of several folders, such as inbox, sent items, drafts, spam, trash, archive, etc., each of which may be considered as a separate state. As another example, a home screen of a computing device may consist of a grid comprising links or shortcuts to application programs or device functionalities and arranged over multiple alternating pages or sub-screen displays, each of which may also be considered as a distinct state. In some exemplary embodiments, the ensemble of interactive elements may be a subset of the displayed elements displayed in the layout of the screen display. For example, a container of messages present in a screen display of a text messaging application may not be part of the definition of the respective state, as opposed to other elements in the same layout such as a "compose" button, one or more tab buttons indicating a screen of the application, or the like.

In some exemplary embodiments, the intermediary operations sequence may be obtained by making a selection from among a plurality of alternative intermediary operations sequences based on a score indicative of a likelihood of success in executing the corresponding alternative intermediary operations sequence to completion. The score may be based on usage statistics of the respective operations sequence. Additionally or alternatively, the score calculation may be configured to prefer short sequences over long sequences, such as by reducing the score for each further operation within the sequence.

In some exemplary embodiments, the intermediary operations sequence may be obtained by prompting a user of the computing device to complete execution of the operations sequence. The user may be prompted in response to a determination that execution of the operations sequence cannot be completed automatically. The user operations may be monitored to determine the intermediary operations sequence. The monitored intermediary operations sequence may be recorded and stored for future use so as to allow for future automatic recovery when the execution of the operations sequence or other operations sequences cannot be completed automatically.

In some exemplary embodiments, the automatic execution of the operations sequence may involve making a determination of whether or not an application program that an operation of the operations sequence represents user interaction therewith is installed on the computing device, and responsive to the application program not being installed, the user may be prompted to activate execution of a sequence to download the application program. Additionally or alternatively, the application program may be downloaded automatically, with or without requesting the user's approval before downloading. In some exemplary embodiments, the automatic execution of the operations sequence may involve making a determination of whether or not an application program that an operation of the operations sequence represents user interaction therewith is currently running in the computing device. In case that the application program is running but is not in a foreground of the computing device, the application program may be switched to the foreground so as to allow interaction therewith. Additionally or alternatively, in case the application program is not running, the application program may be launched automatically. In some exemplary embodiments, the automatic launch of the program may be performed by executing a user-defined operations sequence. Additionally or alternatively, the program may be launched by invoking a suitable Application Programming Interface (API).

In some exemplary embodiments, all operations by the user may be monitored and an operations sequence may be defined implicitly based thereon. The user may be prompted to provide an identifier for future retrieval and execution of an implicitly defined operations sequence based on its usage statistics meeting a criteria, such as frequent usage by the user, frequent usage by users similar to the user (e.g., having the same usage profile of the user), or the like.

Another technical solution is to determine a current state of the computing device responsive to obtaining a user command to switch the computing device to a target state, and use one or more of the operations sequences retained in the repository to determine an operations sequence configured to change the state of the computing device from the current state to the target state when executed.

In some exemplary embodiments, the operations sequence may be determined by identifying a portion of a first retained operations sequence having a first ordered operation applicable in the current state and a last ordered operation configured to change the state of the computing device to an intermediate state, identifying a portion of a second retained operations sequence having a first ordered operation applicable in the intermediate state, and determining the operations sequence to comprise the portion of the first retained operations sequence followed by the second operations sequence. Additionally or alternatively, the operations sequence may be determined by obtaining and analyzing a data structure of a graph comprising nodes representing states of the computing device and edges representing retained operations sequences, such that an edge from a source node to a destination node corresponds to a retained operations sequence applicable in the state represented by the former and configured to switch the computing device to the state represented by the latter. The graph may be analyzed to determine a path from a node corresponding the current state to a node corresponding the target state. The operations sequence may be generated based on the retained operations sequences corresponding to edges in the path.

Yet another technical solution is to provide unique identifiers to each interactive element in a GUI. In some exemplary embodiments, a layout of the GUI is obtained to determine one or more interactive elements in the layout. A unique label may be assigned to each interactive element and the label may be displayed in visible proximity to the corresponding interactive element. The unique labels may be numbers, such as $\{0, 1, 2, 3, \ldots\}$, characters, such as $\{A,$ B, C, . . . }, roman numerals, such as {i, ii, iii, iv, . . . }, or the like. Additionally or alternatively, the unique label may be strictly unique in the context of a specific layout and may be reused for another element in a different layout. An element in a layout in a specific state may be assigned different labels at different times, such as in view of a different content of other interactive elements, e.g., collection elements comprising additional or other items. In some exemplary embodiments, speech recognition mechanism may be employed to detect vocal indication of a label by a user, and user interaction operation on the corresponding interactive element may be automatically performed accordingly.

In some exemplary embodiments, the user may indicate a desired interaction with an interactive element by indicating its assigned unique label, or by indicating its inherently displayed label. For example, an icon of WhatsApp™ application program may be interacted with either by pronouncing its assigned unique label (for example, the number "four"), or by indicating the inherent label of the icon— "whatsapp".

In some exemplary embodiments, the user interaction operation on the indicated element may be recorded for inclusion in an operations sequence of one or more user interaction operations. The operations sequence may be associated with an identifier to be used for retrieving the operations sequence for future executions. The identifier may be used to retrieve the operations sequence during recording of another operations sequence, thereby allowing for incorporation of previously recorded operations sequences within newly recorded ones. The recorded operations sequences may be shared among a plurality of users of computing devices. The sharing may be performed selectively in response to criteria being met by usage statistics being collected. A repeated execution of the recorded operations sequence by a user may be automatically identified, and the user may be prompted to input an identifier for association with the recorded operations sequence to allow retrieval of the recorded operations sequence using the identifier.

In some exemplary embodiments, a publisher, developer, distributor, or a similar entity responsible for an application, referred to herein generally as a developer, may be informed on operations sequences used by users. The developer may be informed of the community's usage of her application, inducing her to develop specific operations that are used by the community of users. As an example, a developer may be notified that a sequence of four actions is performed frequently by a substantial portion of the users, such as about 1% or more, about 1,000 users or more, or the like. Such sequences may be deemed as "popular". The developer may, in response, develop an atomic user interaction that is configured to perform the sequence or portion thereof. The developer may be allowed to update the operations sequence to use the newly developed atomic user interaction instead of two or more user interactions that were previously used. In some exemplary embodiments, the newly developed atomic user interaction may be more efficient, such as by aggregating several separate server transactions into a single transaction, or the like. Additionally or alternatively, the newly developed atomic user interaction may be more stable, such as have a higher likelihood of successful execution. In some exemplary embodiments, the newly developed atomic user interaction may be a vocal command Additionally or alternatively, an alternative operations sequence using the newly developed atomic user interaction may be used by users and based on usage statistics may be automatically determined to be a preferred alternative over the original operations sequence. In some exemplary embodiments, both the alternative operations sequence and the original operations sequence may be assigned the same identifier (or have a shared set of identifiers, which may or may not be the entire set of identifiers for each sequence). Based on the shared one or more identifiers, it may be automatically determined that both sequences are alternatives of one another. Additionally or alternatively, the automatic determination may be based on both sequences having the same end-result.

In some exemplary embodiments, an operations sequence executed by the user may be automatically identified as being identical to an operations sequence retained in a repository of operations sequences. An identifier associated with the retained operations sequence and useful for retrieval thereof may be obtained, and the user may be prompted to use the identifier for triggering automatic execution of the operations sequence in the future.

In some exemplary embodiments, an element of the GUI may be identified as an element which an operation purported to be performed on is the first operation in a retained operations sequence having an identifier allowing its retrieval and execution. A special visual marking may be used to indicate existence of such operations sequence with relation to the element, for example by using a label of different color, size, and/or shape, a blinking or semitransparent label, or the like.

In some exemplary embodiments, an item being selected from a collection displayed by the GUI during recording of the operations sequence and referred to by a portion of the identifier may be automatically identified and designated as a parameter, such that the operations sequence may be retrieved and performed exactly the same but for a different item being selected from the collection by use of the identifier with reference to the different item in substitute of the parameter portion. For example, an operations sequence consisting of selecting a person X from a contact list stored on the computing device and sending that person a message soliciting participation in an event may be provided with an identifier "invite X". The X portion may be identified as a parameter for contact person, such that a user command to "invite Y" causes retrieval and execution of the identical operations sequence but for the person being selected from the contact list and sent to the message is Y instead of X. In some exemplary embodiments, the identification of X as a parameter may be automatic identification or may be based on user indication, such as using the word "parameter".

In some exemplary embodiments, an interactive element in the layout of the GUI displayed by the computing device may be determined as comprising a free-text input element. A comparison between audio of speech obtained from the user and identifiers of predefined vocal commands (either directly or indirectly, such as by comparing a text string generated using speech to text engine and comparing it to textual identifiers of vocal commands) may be performed, and, in response to a determination of a mismatch, the speech may be transformed to text which may then be input to the free-text input element. The text may be optionally thereafter transformed into synthesized speech which may then be delivered to the user for listening, so that the user may confirm the text or request corrections, for example.

In some exemplary embodiments, the computing device may be provided with a proximity sensor. The proximity sensor may be exploited to allow a user to toggle on and off between speech recognition mode and audio playing mode of the computing device during recording of an operation sequence performed at least in part through voice commands or during execution of such operations sequence using voice commands. The toggling on and off may be effected by extension of the user's hand towards the device, for example.

One technical effect of utilizing the disclosed subject matter is to customize a user interface for operating a computing device through succinct communication and minimal effort from a user.

Another technical effect of utilizing the disclosed subject matter is to enable forming a collective library of useful operations sequences that is cumulatively and dynamically evolving through collaborative action of a plurality of users, each making a small contribution that combines with those of the others. Such process of deferring labor or resource investment in general to a large group of people is also referred to as "crowdsourcing". Thus, by utilizing the disclosed subject matter, the dissemination of useful operations sequences among users and filtration out of useless or even harmful ones through crowdsourcing may be enabled, based on aggregated data analytics of the contents of the shared repository and collected usage statistics, for examples.

Yet another technical effect of utilizing the disclosed subject matter may be to take advantage and utilize repetitive usage patterns for improving human-machine interaction by harnessing the power of crowdsourcing.

Referring now to FIG. 1 showing flowchart diagram of a method, in accordance with some exemplary embodiments of the subject matter.

On Step 100, an identifier of an operations sequence may be obtained. The operations sequence may comprise one or more operations, each operation representing a user interaction with an element of a user interface for operating a computing device. The identifier may be obtained by receiving a user command via any input modality. For example, the user may provide a command using a keyboard, using a pointing device, or the like. In some exemplary embodiments, the user may provide a vocal command. The identifier may be extracted from the command, such as by manipulating a string representing the command In some exemplary embodiments, a vocal command may be converted into a text string, which may be analyzed to extract the identifier.

On Step 110, a repository may be searched using the identifier in order to retrieve the operations sequence. The repository may comprise operations sequences previously executed by a computing device on behalf of a user. In some exemplary embodiments, the repository may comprise operations sequences that were executed by another computing device other than the computing device on which the identifier was obtained and on behalf of another user other than the user providing the identifier.

In some exemplary embodiments, the repository may comprise operations sequences for which identifiers were extracted from vocal commands obtained from one or more users other than the user of the computing device on which the identifier was obtained.

The repository may be locally retained within the computing device or remotely retained, such as in a server reachable to the computing device via a computerized network (e.g., the Internet). In some exemplary embodiments, a local repository may be periodically updated based on a remote server, such as to include any new information that became accessible to the computing device since a previous update. In some exemplary embodiments, the update may be perform based on a set of installed applications on the device, so as to include operations sequences that are relevant to such applications alone. Such a selective update may reduce required storage space and bandwidth. In some exemplary embodiments, a remote comprehensive repository may be used, such as by instructing the remote server to perform a search query, when the device has connectivity to the remote server. In case there is no connectivity (e.g., no Internet connection), a local repository may be used, thereby allowing execution of some operations sequences (such as sequences relevant to the user, relevant to the applications installed on the device, or the like). Additionally or alternatively, the local repository may be used as a cache for improving performance of sequences that are frequently or previously used by the user of the device.

On Step 120, the operations sequence obtained on Step 110 may be automatically performed on the computing device on which the identifier was obtained on Step 100. The operations may be performed iteratively according to their defined order in the operations sequence. As is explained in greater detail hereinbelow, in some cases, exact execution of the operations sequence may not be possible and the actual execution may be different than the defined operations sequence, such as by executing additional operations not defined in the sequence, by executing a different operation than an operation defined in the sequence, or the like. In some exemplary embodiments, automatic execution of each operation may use an API provided by the operating system of the computing device or by an application on which the operation is performed. Additionally or alternatively, automatic execution may mimic user GUI operations, such as by using an external device for performing operations on the computing device, by invoking a driver of an input device, or the like.

Execution of the operations sequence may be monitored (130). Based on the monitored execution, usage statistics for the operations sequence may be updated (140). In some exemplary embodiments, the usage statistics may be retained within the repository. The usage statistics may include, for example, total number of execution attempts, total number of successful executions, total number of unsuccessful executions, number of different users that executed the sequence, number of successful execution per user, time since last execution by any user, average time since last execution for all users, profile of an average executing user, or the like.

On Step 150, the operations sequence may be made available to additional users based on the meeting of criteria by the usage statistics, such as reaching a threshold of independent executions by different users, for example. In some exemplary embodiments, the usage statistics may be indicative to whether the operations sequence is being frequently and successfully used. In some exemplary embodiments, certain usage statistics may be useful to determine whether the operations sequence is useful and is safe to be used by others. In one embodiment, a malicious user may define a malicious operations sequence which as intermediate step, copies data from the device and sends the data to a server controlled by the malicious user. Usage statistics of such operations sequence may indicate that only a single or at most handful of users are executing this sequence and therefore it may not be considered safe. As another example, a malicious sequence may be defined which deletes the entire data from the device. The malicious sequence may have usage statistics indicative of infrequent usage. Hence, such malicious sequence may not be considered as safe. Additionally or alternatively, modified behavior after execution of the sequence may also be monitored and serve as an indication to the sequence being unsafe. As an example, after the sequence is executed, device monitoring may detect deteriorated performance of the device, reduced network connectivity of the device, or the like.

In some exemplary embodiments, an operations sequence which was previously made available to additional users may be made unavailable in view of a change in the usage statistics, in view of feedback from users (e.g., reporting the operations sequence as incorrect or malicious), or the like. In some exemplary embodiments, users who executed the sequence once may intentionally avoid using the sequence again, hence the disclosed subject matter may crowdsource the publicly available sequences for determining sequences which the users deem as unsafe, and accordingly make the sequence unavailable thereafter.

Figure 2A:
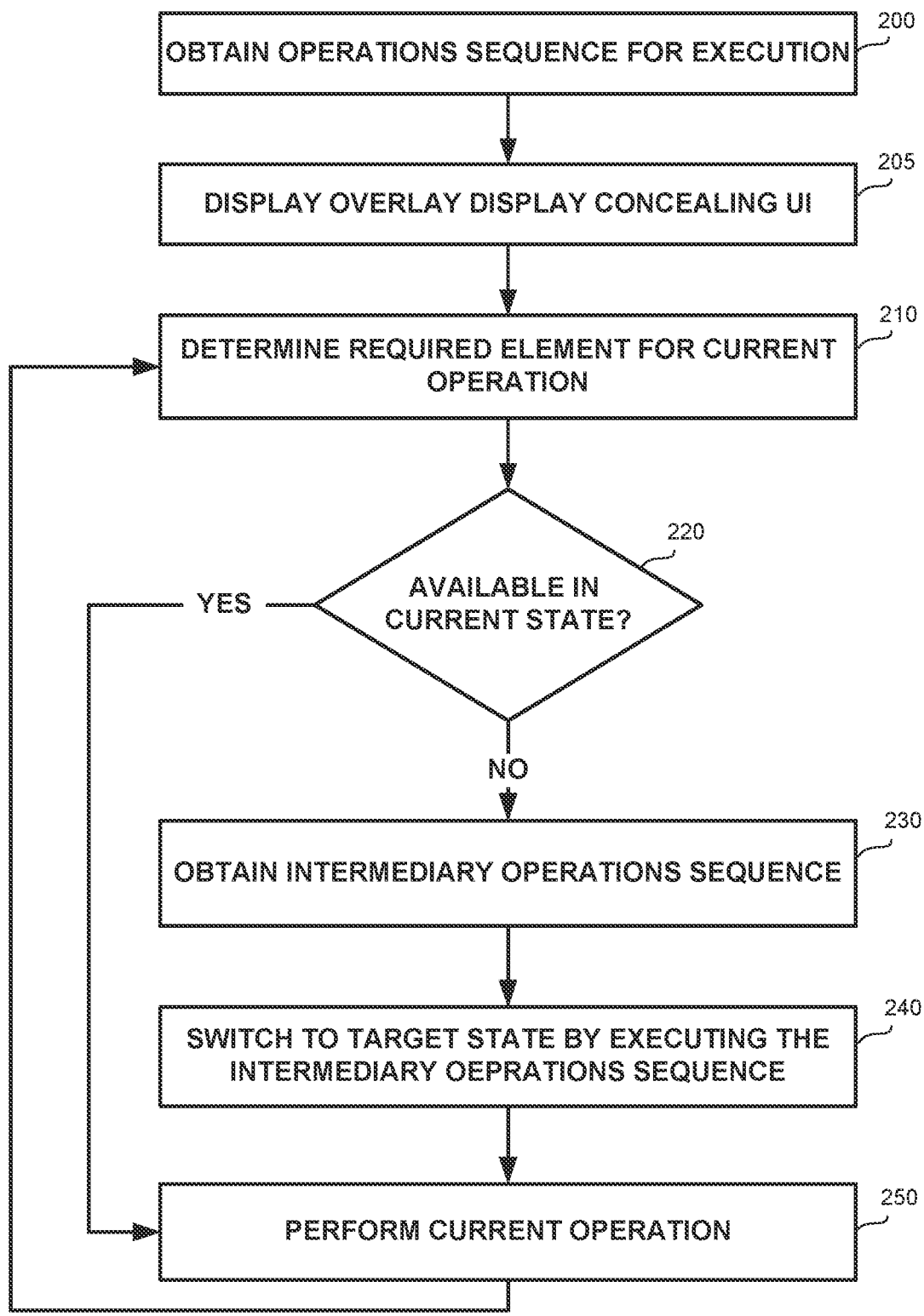
FIG. 2A shows a flowchart diagram of a method, in accordance with some exemplary embodiments of the disclosed subject matter.

Referring now to FIG. 2A showing flowchart diagram of a method, in accordance with some exemplary embodiments of the subject matter.

On Step 200, an operations sequence for execution on a computing device automatically may be obtained, for example by using the method of FIG. 1.

On Step 205, an overlay display for concealing a display of a user interface on the computing device may be displayed, whereby at least a portion of one or more elements of the user interface on which operations of the operations sequence are performed is hidden from the user. The overlay display may be displayed throughout the entire execution of the operations sequence on the computing device. In some exemplary embodiments, the overlay display may be a screenshot of the UI prior to execution of the operations sequence, thereby providing a look and feel of "freeze frame" while automatic interaction with the UI elements is performed. Additionally or alternatively, the overlay display may comprise animation indicative of the operation still being executed, such as "loading" animation. Additionally or alternatively, the overlay display may comprise one or more advertisements. The advertisements may be served to the user based on the characteristics of the user, based on the operations sequence being executed, based on usage profile of the user, or the like. As an example, a user who employs sequences related to playing music may be targeted to music related ads, while a user who frequently employs sequences related to using an e-mail client, may be targeted for improved e-mail client apps.

On Steps 210-250, operations from the operations sequence are handled iteratively in accordance with an order of execution defined by the sequence.

On Step 210, an element of a user interface which is required for performing a current operation of the operations sequence may be determined. For example, in case the operation is activating a button, the element may be the button. As another example, in case the operation is selection from a collection, the element may be the selected item in the collection. As yet another example, in case the operation is inputting text into a free-text field, the element may be the free-text field. As yet another example, in case the operation is reading out loud text from a static text field, the element may be the static text field. In some exemplary embodiments, the element is identified based on a unique and persistent identifier which remains the same in future executions. In some exemplary embodiments, the unique and persistent identifier of the element may remain the same when the same software is executed by other devices. Additionally or alternatively, the identifier may be based on the displayed label of the element (e.g., text near check-box, image on button, or the like). Additionally or alternatively, the identifier may not be based on the displayed label, such as in case the displayed label may change over time, be different for different users, or the like. In some exemplary embodiments, the identifier may be a programmatic name of the element in a namespace associated with the executed software. In some exemplary embodiments, the unique and persistent identifier may be based on other UI elements and the state of the device, such as the third UI element in a specific state; a UI element in a specific state being positioned in a specific location within a layout; or the like. In some exemplary embodiments, the unique and persistent identifier may be based on relative location of the UI element in the layout in a specific state.

On Step 220, a determination may be made as to whether the element is available in a current state of the computing device. In case that the element is available, the method proceeds at Step 250. Otherwise, the method may proceed to Step 230. In some exemplary embodiments, the element is considered available if the element exists and is in an enabled state permitting performance of the desired interaction defined by the current operation.

On Step 230, an intermediary operations sequence, purported to switch the computing device from the current state to a target state in which the element is available for user interaction, may be determined. The intermediary operations sequence may be a sequence used in the past by the user or by other users to complete execution of the sequence, as is explained further in connection with FIG. 2B. Additionally or alternatively, the intermediary operations sequence may be a sequence executed by a user with no connection to the operations sequence being executed in FIG. 2A. In some exemplary embodiments, the intermediary operations sequence may be a synthesized sequence based on portions of available operations sequences. In some exemplary embodiments, the intermediary operations sequence may be determined based on content of the operations sequence repository. In some exemplary embodiments, the intermediary operations sequence may be synthesized by the device executing the operations sequence or obtained from another device, such as a server accessible over a computerized network, which synthesizes the intermediary operations sequence upon request.

Additionally or alternatively, the intermediary operations sequence may be a sequence changing the current state to a next state which would allow execution of one of the succeeding operations after the current operation. In such a case, the intermediary operations sequence may be obtained and when executed it may serve as a replacement of one or more operations appearing in the sequence. In some exemplary embodiments, the intermediary operations sequence may replace the remainder of the operations in the sequence altogether.

In some exemplary embodiments, in case an intermediary operations sequence is required, monitoring of the execution (such as depicted in Step 130 of FIG. 1) may identify such information and update the usage statistics accordingly.

On Step 240, the intermediary operations sequence may be automatically executed on the computing device to cause switching from the current state to the target state. In some exemplary embodiments, the intermediary operation sequence may be executed similarly to the execution of the operations sequence (e.g., performing Step 210-250 for each operation in the intermediary operations sequence and potentially requiring another intermediary operations sequence to complete its execution).

On Step 250, the current operation may be performed on the element and the automatic execution of the operations sequence may proceed to the next operation in the operations sequence. Similarly, the process may be repeated and Steps 210 to 250 performed for each operation in the operations sequence until execution of the entire operations sequence is completed.

Figure 2B:
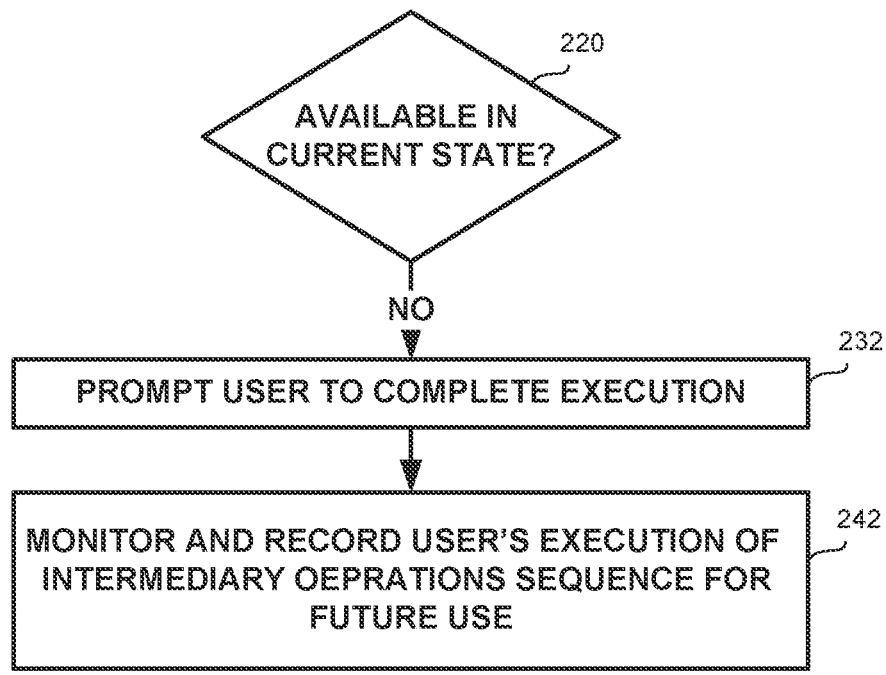
FIG. 2B shows a flowchart diagram of a method, in accordance with some exemplary embodiments of the disclosed subject matter.

Referring now to FIG. 2B showing flowchart diagram of a method, in accordance with some exemplary embodiments of the subject matter.

After Step 220 determines that the element is not available in the current state, Step 232 may be performed. On Step 232, the user may be notified of the inability to conclude the execution. In some exemplary embodiments, Step 232 may be performed only after failing to automatically obtain an intermediary operations sequence (Step 230 of FIG. 2A).

In response, the user may manually perform one or more operations to complete the execution of the operations sequence. The manual execution of operations by the user may be monitored and recorded for future use (Step 242). The user may perform an intermediary operations sequence to reach the target state, or, alternatively, perform remaining operations to complete execution of the sequence without performing the current operation. For example, instead of performing operations A, B, C, D and E as defined by the remainder of operations sequence, the user may perform operations X, Y, D and E. Hence, the intermediary operations sequence may be determined to be the X, Y sequence and it may be used in the future as an alternative to performing A, B, C when the operation A is unavailable and the sequence requires performing A, B, C followed by D.

Figure 2C:
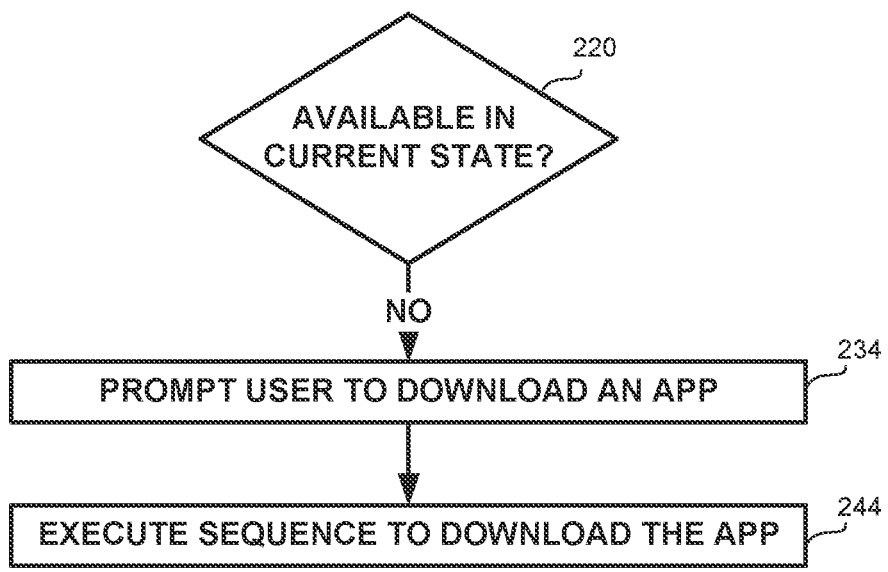
FIG. 2C shows a flowchart diagram of a method, in accordance with some exemplary embodiments of the disclosed subject matter.

Referring now to FIG. 2C showing flowchart diagram of a method, in accordance with some exemplary embodiments of the subject matter.

In some exemplary embodiments, the required element may not be available in the present state due to an application program not being installed on the computing device. On Step 234, the user may be notified that the application program needs to be installed on the device, and potentially downloaded from an external source, such as an applications repository. The user may be asked to permit the downloading and installation of the application program, such as by authorizing the action. In some exemplary embodiments, such an action may require a certificate, such as in case the application program is downloadable from a store which requires performing of a purchase transaction before downloading the application program.

In some exemplary embodiments, the user may download the application program manually.

Additionally or alternatively, on Step 244, the application program may be downloaded automatically. In some exemplary embodiments, the automatic downloading may be performed by executing an operations sequence that is operable to download the application program. Additionally or alternatively, the application program may be downloaded by invoking API instructions which are programmatically configured to download the application program.

Figure 3:
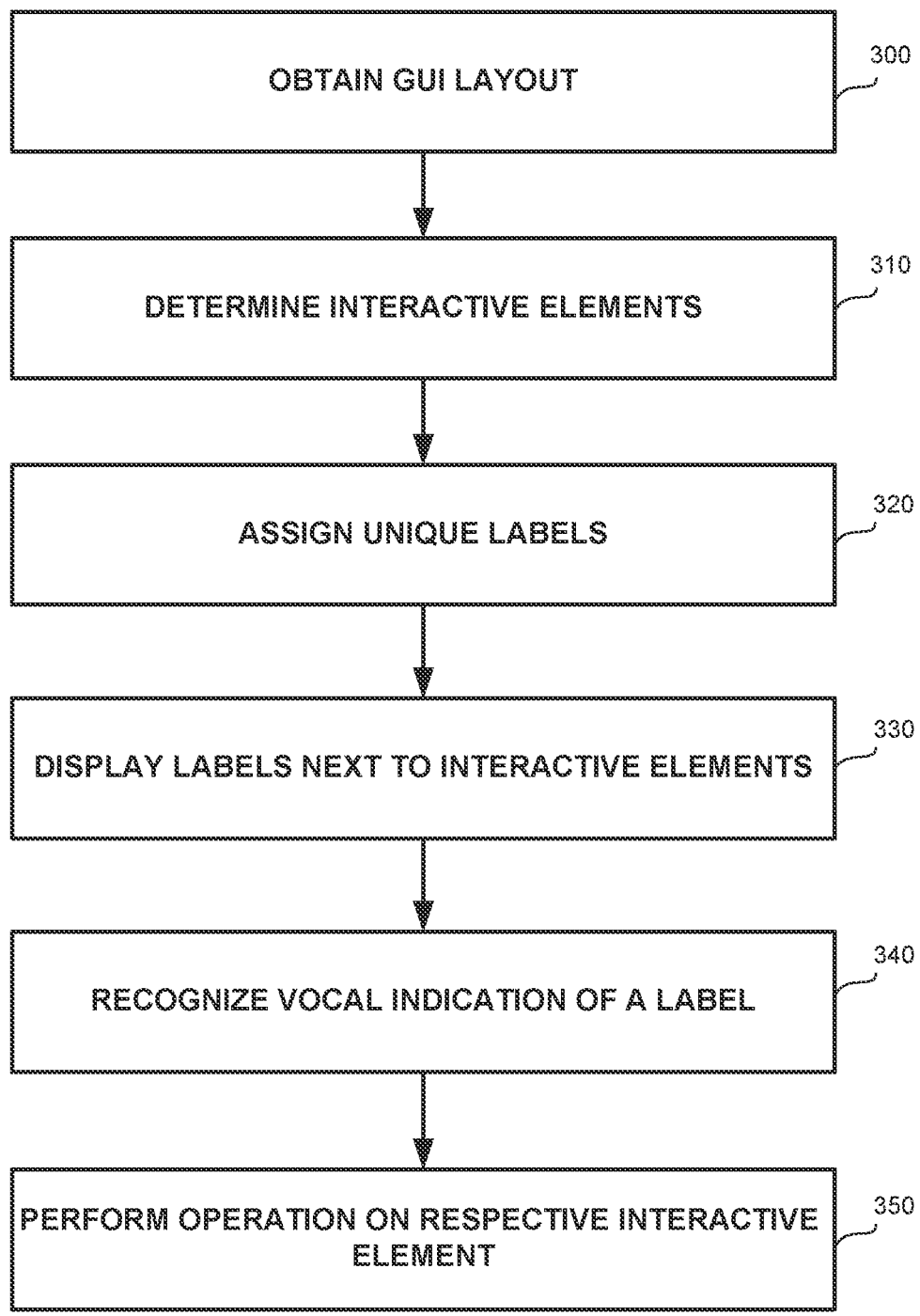
FIG. 3 shows a flowchart diagram of a method, in accordance with some exemplary embodiments of the disclosed subject matter.

Referring now to FIG. 3 showing flowchart diagram of a method, in accordance with some exemplary embodiments of the subject matter.

On Step 300, a GUI layout may be obtained. The GUI layout may be the presently displayed GUI layout.

On Step 310, elements in the GUI layout may be determined. In some exemplary embodiments, interactive elements, such as clickable elements, selectable elements, enabled text-fields, or the like, may be determined. In some exemplary embodiments, non-interactive elements, such as image elements, text elements, or the like, may also be determined and processed in addition to the interactive elements. The elements may be determined using an API for GUI elements provided by the operating system or by an application. Additionally or alternatively the elements may be determined by applying computer vision algorithms on a captured image of the screen or on a sequence of captured screen images. The computer vision algorithms may comprise machine learning algorithms, including supervised learning algorithms and unsupervised learning algorithms. The algorithms may use information provided by users of the system to improve their ability to determine GUI elements.

On Step 320, each element is assigned a unique label. The unique labels may be numbers, such as {0, 1, 2, 3, ... }, characters, such as {A, B, C, ... }, roman numerals, such as {i, ii, iii, iv, ... }, or the like. Additionally or alternatively, the unique label may be strictly unique in the context of the specific layout and may be reused for another element in a different layout. An element in a layout in a specific state may be assigned different labels at different times, such as in view of a different content of other interactive elements, e.g., collection elements comprising additional or other items.

On Step 330, the labels may be displayed in the GUI layout. In some exemplary embodiments, each label may be displayed in visible proximity to the corresponding element of the GUI.

On Step 340, an indication of an element of the GUI by the user may be recognized. The user may refer to elements of the GUI using their label. In some exemplary embodiments, vocal commands may comprise vocal indication of the added, layout-unique identifier of the referenced element. In some exemplary embodiments, the user may alternatively use other labels, such as inherent labels of the element, which existed prior to the addition of the added, layout-unique identifiers. One example to such inherent labels may be a label of an icon that is displayed next to the icon as part of the original GUI of the relevant program. Another example may be a textual label appearing on a button, or an annotation below or in proximity to a displayed graphical image.

On Step 350, based on the user referencing the element as recognized on Step 340, an operation may be performed on the respective element. The operation may be, for example, interacting with the interactive element (e.g., selecting a selectable item, clicking on a clickable item, changing focus to selected element, or the like). Additionally or alternatively, the operation may be reading out loud a content of the element, such as reading out loud, using synthesized voice, a text content of a text element. The operation may be defined by the user. In some exemplary embodiments, there may be a default interactive behavior with each element. Additionally or alternatively, the user may specify a non-default behavior. As an example, consider that the element identified by "1" is a selectable contact person in a container. Upon selection of the contact person (e.g., by clicking on the element), a phone call is initiated to the contact person. If the user says "1", the default interaction with the element may be performed, such as clicking on the element and thus initiating a call. Alternatively, the user may say "read 1". Based on such command, the device may synthesize an audio reading out loud the textual content of the element, and may accordingly read out loud the name of the contact person as displayed graphically on the screen. Such a functionality may be useful in cases where a user has limited ability to read content from a screen, such as when driving a car or when the screen is located remotely from the user.

In some exemplary embodiments, the automatic execution of the operation may be performed by mimicking interaction with the GUI. Additionally or alternatively, the automatic execution may be performing without directly interacting with the GUI, such as by invoking a same function invoked once the element is interacted. As an example, consider a press button operation on a button. In one embodiment, an event may be generated that simulates for the GUI a click on the button. The GUI may accordingly handle the event and process the button click thereby performing the desired operation. Additionally or alternatively, upon the GUI detecting the button being clicked, an API function is invoked, such as for example the function "performActionOfThisButton( )". The operation may be performed by executing the API function directly without involving the GUI layer.

Figure 8A:
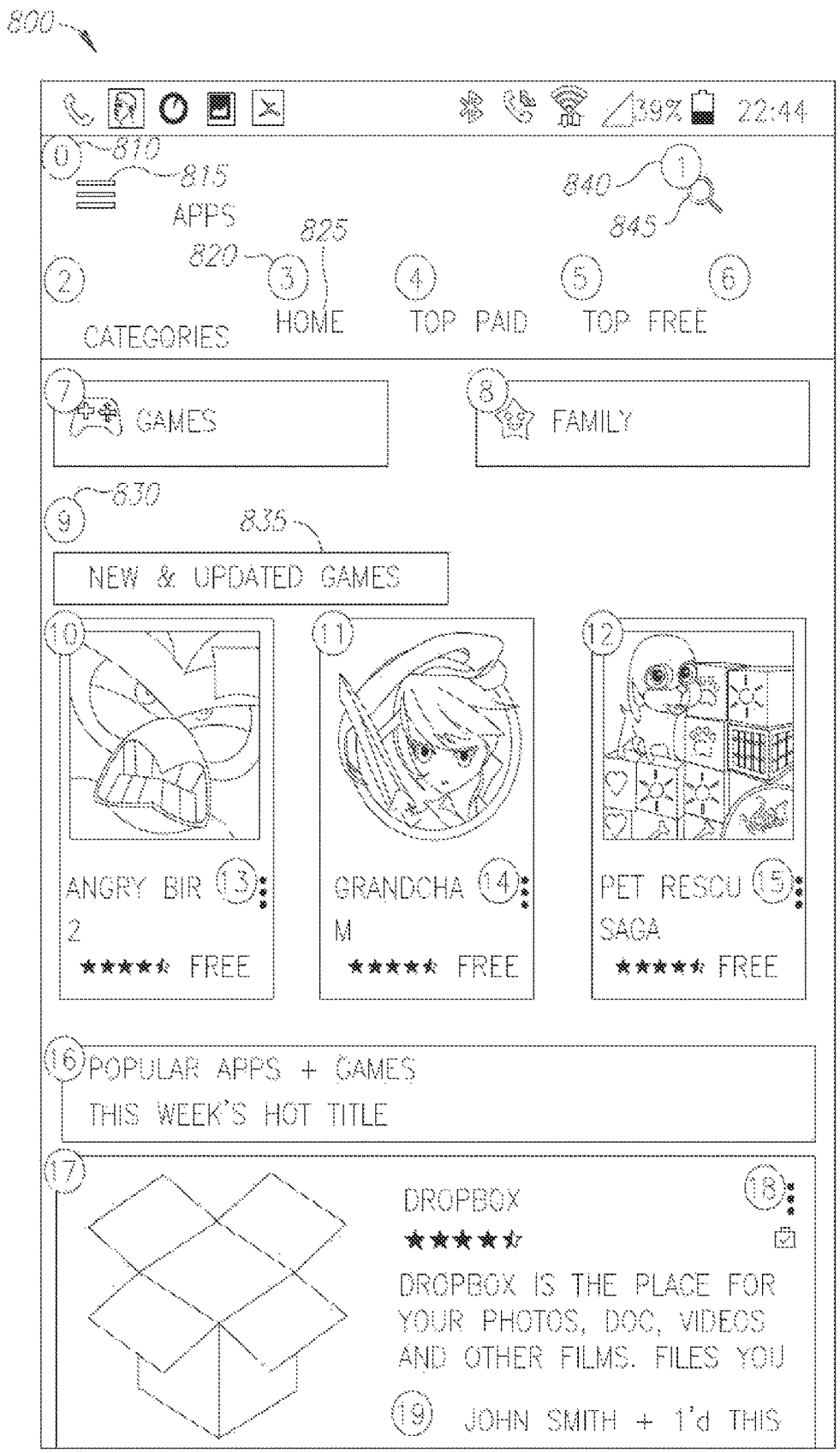
FIG. 8A shows an exemplary screenshot of a computerized environment in which the disclosed subject matter is used, in accordance with some exemplary embodiments of the disclosed subject matter.
Figure 8B:
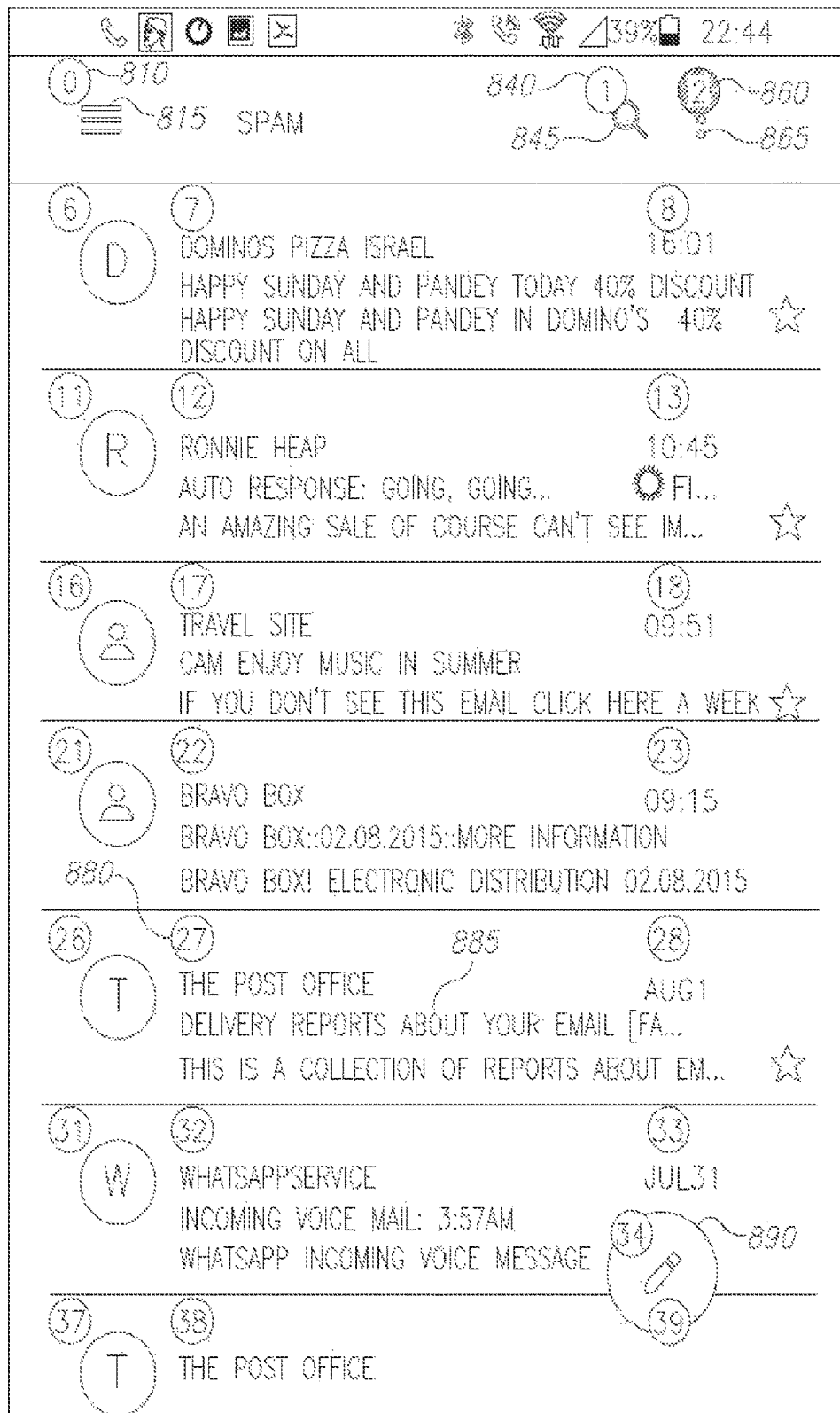
FIG. 8B shows an exemplary screenshot of a computerized environment in which the disclosed subject matter is used, in accordance with some exemplary embodiments of the disclosed subject matter.

Referring now to FIGS. 8A and 8B showing exemplary screenshots of a computerized environment in which the disclosed subject matter is used, in accordance with some exemplary embodiments of the disclosed subject matter. The screenshots of FIGS. 8A-8B may be created based on Step 330 of FIG. 3.

Screen 800 exemplifies displaying assigned labels next to elements of the GUI layout. Element 815 is assigned Label 810 ("0"); Element 825 is assigned Label 820 ("3"); Element 835 is assigned Label 830; Element 845 is assigned Label 840. In some exemplary embodiments, the labels are assigned in accordance with a top to bottom, left to right, assignment order. However, any other order may be used. In some embodiments, the assignment order may be based on the locale information, such as assigning in a top to bottom, right to left, order for languages which are read right to left, and assigning in a top to bottom, left to right, order for languages which are read left to right.

As is exemplified in Screen 800, the unique labels are displayed in visible proximity to the corresponding element. The user may provide vocal commands which refer to the elements by referring to the assigned labels or the inherent label. For example, the user may interact with the "Home" clickable element (825) by providing the command "three" (referring to the assigned label) or by providing the command "home" (referring to the inherent label).

In some exemplary embodiments, Screen 800 is a screen in an application program. The application program has additional screens, such as Screen 800'. Screen 800' shows the SPAM mailbox of the application program.

In Screen 800', each identified element is assigned a label. In some cases, the same label is used for the same element, such as Labels 810, 840, being used for the same elements (Elements 815, 845) as in Screen 800. Additionally or alternatively, a label may be used in Screen 800' for a different element than was used in Screen 800.

In some exemplary embodiments, Screen 800' comprises a collection of items, such as a collection of emails. The user may refer to items in the collection using their assigned label. For example, the e-mail from "The Post Office" may be referred to using Label 880 (e.g., the identifier "twenty seven") which corresponds to Element 885.

In future executions of the application program, the label of Element 885 may change, such as in case additional e-mails are received and are ordered prior to the above-mentioned e-mail in the SPAM mailbox.

In some exemplary embodiments, Screens 800 and 800' may be screens in different states of the device, albeit both screens are of the same program application. As an example only, layout of the state represented in Screen 800 may comprise persistent elements which remain in different executions of the application program, such as Elements 815, 845 and 825 and elements which may change in different executions such as Element 835. The state may be defined using the former and not using the latter. It will be noted that the state may be defined using a subset of the elements which could be used to define it, such as without including Element 815 which may appear in all different states of the application program, or without including Element 845 which may appear in some of the states of the application program. In some exemplary embodiments, the state of Screen 800' may be identified using elements which may be numbered differently in different executions, such as "Compose" Element 890 which may be assigned different labels based on the number of elements preceding it in the label assignment order. In particular, the assigned label may be affected by the number of e-mails in the SPAM mailbox.

In some exemplary embodiments, the visual indication of the label may indicate whether an operations sequence is available for use and commencing by interacting with the visually indicated element. As an example, Label 860 may be visually presented in such a manner, to indicate to the user, that she has an available operations sequence that begins with an operation on Element 865. The operations sequence may be a sequence recorded by the user, a sequence recorded by another user and accessible to the user, or the like. In some embodiments, the visual indication may be different for sequences defined by the user and sequences defined by other users and available for execution by the user.

In some embodiments, the user may query the system to provide the identifiers of such sequences, such as by vocally instructing "operation two". In response, the useable identifier of any operations sequence that commences at an operation on Element 865 may be provided to the user, such as by using synthesized speech.

In some cases, the user may provide an instruction to identify all sequences available in the present screen, such as by vocally instructing "operations". In response, the useable identifier of any operations sequence that commences at an operation on the present screen may be provided to the user.

Figure 4:
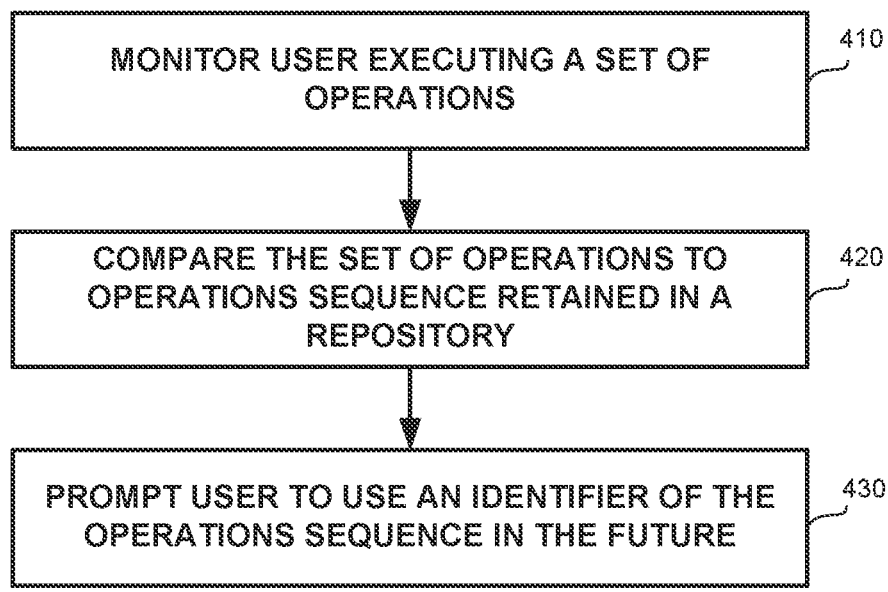
FIG. 4 shows a flowchart diagram of a method, in accordance with some exemplary embodiments of the disclosed subject matter.

Referring now to FIG. 4 showing flowchart diagram of a method, in accordance with some exemplary embodiments of the subject matter.

On Step 410, interaction of a user with the device may be monitored. In some exemplary embodiments, the user may interact with the device using vocal commands, using touch screen, using a keyboard, or through any other input device. In some exemplary embodiments, the monitoring may be performed by a monitoring software installed on the device. In some exemplary embodiments, user interaction with elements of the user interface may be monitored to obtain a set of operations, having a defined order therebetween. In some exemplary embodiments, the set of operations may be determined to be completed upon a condition being met. As an example, each user interaction that succeeds a preceding operation within less than a predetermined timeframe, such as about 5 seconds, about 20 seconds, or the like, may be considered within the same set as the preceding operation. Additionally or alternatively, user interactions may be monitored and added to a set until a lack of user interaction for a predetermined timeframe, such as about 5 seconds, about 20 seconds, or the like, is detected. Such lack of user interaction may be used to determine that the set of operations was completed. Additional user interactions would be added to a new set.

On Step 420, the monitored set of operations may be compared to operations sequences retained in a repository. In some exemplary embodiments, the comparison may be performed locally on the device. Additionally or alternatively, the set may be transmitted to a remote server having access to the repository for analysis. In some exemplary embodiments, based on the comparison, a retained operations sequence that is identical to the set may be determined. In some exemplary embodiments, usage statistics of the retained operations sequence may be updated based on the monitored execution, such as performed with respect to Step 140 of FIG. 1. Additionally or alternatively, a substantially similar operations sequence may be obtained, such as a sequence commencing in the same state, reaching the same target state, and performing a same user interaction in the target state either on the same element or on a similar element contained in the same collection. Additionally or alternatively, a substantially similar sequence may include similar operations, such as having a substantial overlap between operations performed between the commencing state and the target state, such as about 70% overlap.

In some exemplary embodiments, an identifier of the identified operations sequence may be obtained. In some exemplary embodiments, the operations sequence may have a plurality of identifiers. An identifier may be selected from the plurality of identifiers. In some exemplary embodiments, the plurality of identifiers may be filtered based on locale information to provide identifiers in the language used by the user of the computing device. Additionally or alternatively, the identifier may be selected based on retrieval statistics, such as by selecting the most popular identifier used to retrieve the operations sequence, the most trending identifier, or the like.

On Step 430, the user may be prompted, such as using a pop-up message, an audio notification, a push notification, or in any other manner, and notified that the identifier may be used to perform the operations sequence in the future instead of manual operation of the set of operations, as was performed. In some exemplary embodiments, the identifier may be obtained from the user, by prompting the user to provide an identifier of her choice.

In some exemplary embodiments, Step 430 may be performed for operations sequence comprising a number of operations above a minimal threshold, such as more than a single operation, more than three operations, or the like.

Figure 5:
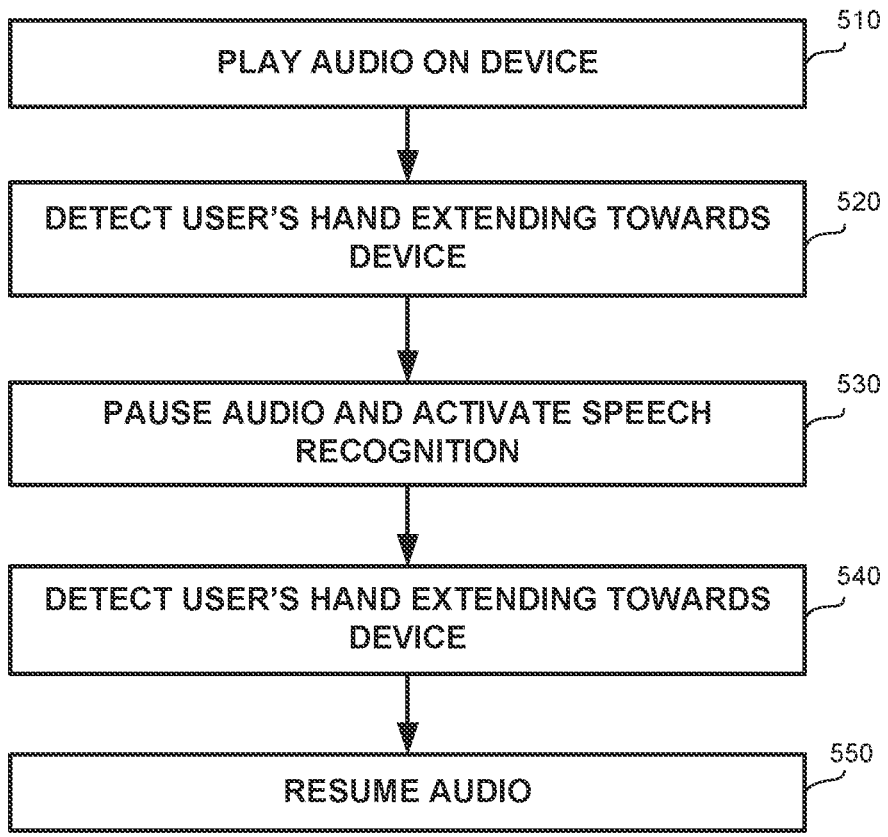
FIG. 5 shows a flowchart diagram of a method, in accordance with some exemplary embodiments of the disclosed subject matter.

Referring now to FIG. 5 showing flowchart diagram of a method, in accordance with some exemplary embodiments of the subject matter.

On Step 510, a device may play audio, such as using speakers of the device, using external speakers, or the like. The audio may be audible to a user of the device.

On Step 520, the user may extend her hand towards the device. The device may detect such gesture, such as using proximity sensors, motion sensors, or the like.

On Step 530, the device may pause the audio being played. In some exemplary embodiments, the device may turn down other audible sources in proximity thereof, such as a car radio connected to the device wirelessly, such as using Bluetooth protocol.

In some exemplary embodiments, the device may activate speech recognition mechanism. As the audio is paused and is no longer audible, there may be potentially less background sound which may interfere with the operation of the speech recognition mechanism. Thus, the user may be able to provide a vocal command without being disrupted by the background sound.

On Step 540, a second gesture by the user, such as extending her hand towards the device, may be detected. In some exemplary embodiments, the device may not attempt to detect the second gesture as long as the speech recognition is operating (e.g., while the user is speaking; within a predetermined timeframe, such as, for example, about 10 seconds after the user ceased speaking to allow for successive vocal commands; or the like).

On Step 550, the audio may be resumed in response to the detected second gesture.

In some exemplary embodiments, the method of FIG. 5 may be utilized while the user is driving her car. While driving, the user may wish to reduce interaction with the device. The hand extension gesture may be a gesture which does not require substantial precision by the user and therefore it may interfere less with her ability to drive the car than, for example, reaching a mute button.

Figure 6:
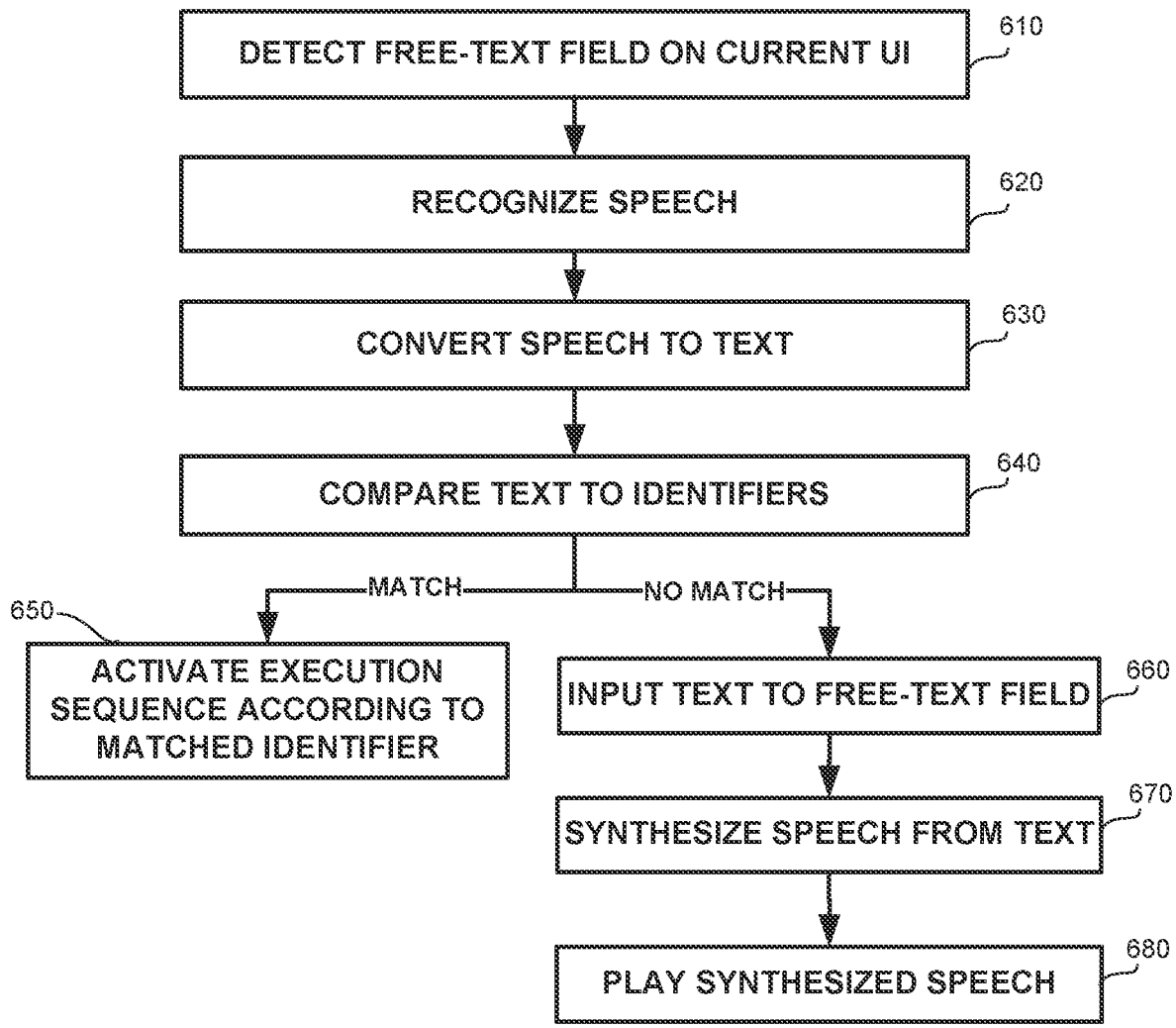
FIG. 6 shows a flowchart diagram of a method, in accordance with some exemplary embodiments of the disclosed subject matter.

Referring now to FIG. 6 showing flowchart diagram of a method, in accordance with some exemplary embodiments of the subject matter.

On Step 610, it may be determined that a free-text field is part of the layout of the GUI displayed to the user. The free-text field may allow the user to input text, such as a string, a mutli-line text, or the like.

On Step 620, speech by the user may be obtained and analyzed. In some exemplary embodiments, a speech recognition module may be utilized to analyze the audio of the speech and generate a text (e.g., string) based thereon on Step 630.

On Step 640, the text may be compared with identifiers of operations sequences, such as identifiers associated with the operations sequences of a local or remote repository of operations sequences. In some exemplary embodiments, the comparison may be performed after performing textual analysis on the text, such as omitting conjunctions and other less important words, normalizing words (e.g., transforming gender-specific language to gender-neutral or to predetermined general-specific language; transforming plural into singular or vice versa; or the like), or the like.

In case a match is found (Step 650), the operations sequence may be retrieved based on the identifier and executed on the device of the user. Otherwise, Step 660 may be performed.

On Step 660, the text may be inputted to the free-text field. In some exemplary embodiments, there may be several free-text fields. A target free-text field may be selected. In some exemplary embodiments, the selection may be based on manual selection by the user (e.g., vocal selection, selection using a pointing device, or the like), based on the element being the focused element in the UI, the element being the free-text input element that is most adjacent to the focused element in the UI, the element being the free-text input that is most frequently used in the UI (e.g., based on usage history of the user, of users having usage profile similar to the user, of a group of users, or the like), or the like. In some exemplary embodiments, the generated text may be inputted notwithstanding any text manipulation performed during Step 640.

On Step 670, text to speech synthesizer may be used to synthesize audio based on the text.

On Step 680, the synthesized speech may be played in a manner audible to the user. In some exemplary embodiments, the synthesized speech may differ from the original recognized speech of Step 620. In some exemplary embodiments, the synthesized speech may provide for a synthesized echo of the command inputted vocally to the device, allowing the user to identify what was inputted without requiring the user to read the text generated by the speech to text mechanism.

Figure 7:
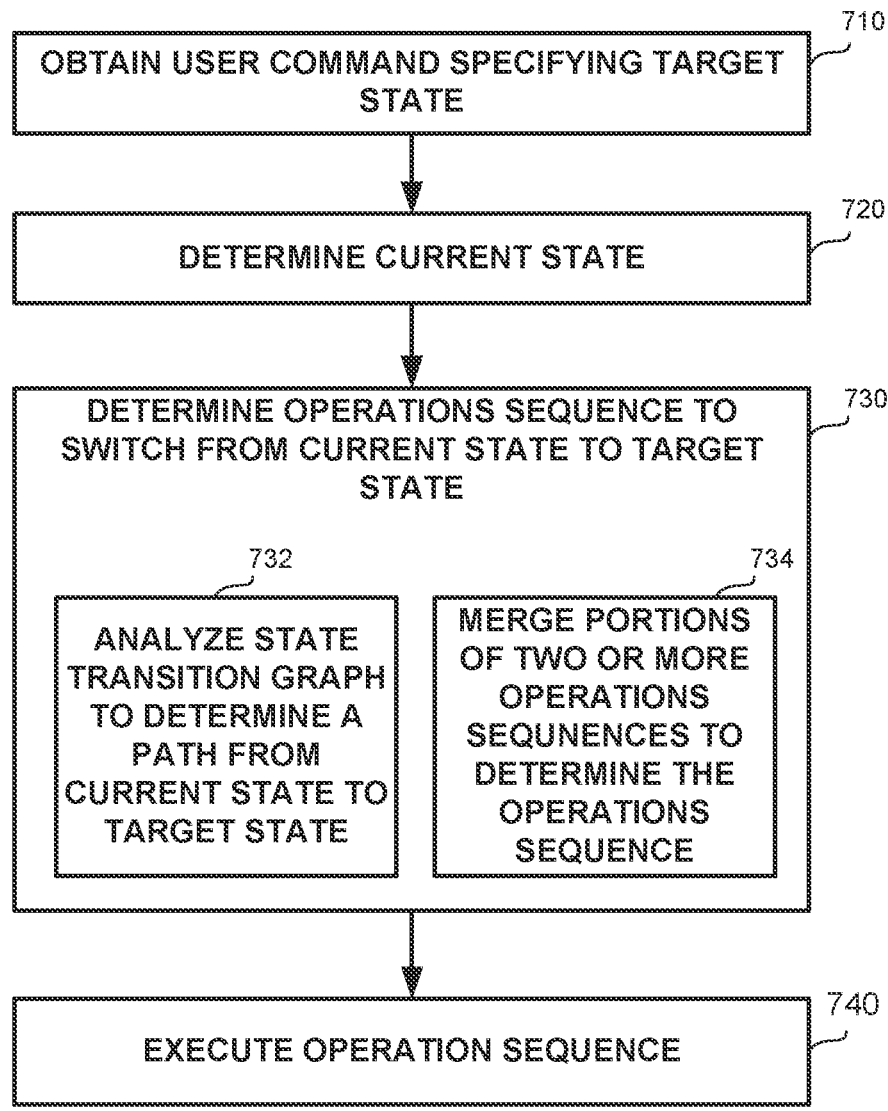
FIG. 7 shows a flowchart diagram of a method, in accordance with some exemplary embodiments of the disclosed subject matter.

Referring now to FIG. 7 showing flowchart diagram of a method, in accordance with some exemplary embodiments of the subject matter.

On Step 710, a user command may be obtained. The user command may be a command indicating a desired target state, such as employing a shortcut to reach the inbox of a mail application. In some exemplary embodiments, the command may be to invoke a ubiquitous shortcut to the desired state. The command may be applicable at any state of the device and not limited to a specific commencing state thereof. The user command may be vocal or non-vocal command.

On Step 720, a current state of the computing device may be determined. The state may be determined, for example, based on the layout of the UI and comparing such layout to retained layouts. In some exemplary embodiments, the identification of the current state may require a unique and persistent identifier of a UI element (e.g., interactive UI element, such as a check-box, a clickable object, or the like; a non-interactive UI element such as an image, a displayed text, or the like), which remains the same in future executions and when the same software is executed on another device, such as a device of a different user. The identifier may be based on the displayed label (e.g., text near check-box, image on button, or the like). Additionally or alternatively, the identifier may not be based on the displayed label, such as in case the displayed label may change over time, be different for different users, or the like.

On Step 730, operations sequence that is configured to change the state from the current state to the target state may be obtained. The operations sequence may be retrieved from a repository. Additionally or alternatively, the operations sequence may be generated by merging two or more operations sequences (or portions thereof) that are retained in a repository.

In some exemplary embodiments, a transition graph may be determined. The transition graph may indicate which operations sequences (or portions thereof) may be used to switch from one state to another. The transition graph may comprise nodes and edges. A node in the transition graph may correspond to a state in the computing device. A directed edge in the transition graph connecting between a source node and a destination node may correspond to a retained operations sequence or portion thereof that is applicable in a state corresponding to the source node and is configured to change the state of the computing device to a state corresponding to the destination node. In some exemplary embodiments, the graph may be weighted, where a weight of an edge may be indicative of a likelihood of successful execution of the sequence operations.

In some exemplary embodiments, the transition graph may be analyzed (732) to determine a path from the current state to the target state. The path may indicate a synthesized operations sequence comprising a set of consecutive operations to be performed to change the state from the current state to the target state using one or more sequence operations or portions thereof. In some exemplary embodiments, the path may be selected between a plurality of alternative paths. The selection may be based on the likelihood of successful execution of the corresponding synthesized operations sequences. In some exemplary embodiments, the selection may be performed by selecting a path having a highest cumulative score, wherein the cumulative score may be based on the scores of the edges in the path. Additionally or alternatively, the cumulative score may be affected by a number of operations which are included in the synthesized operations sequence, such as by reducing the score for each additional operation.

In some exemplary embodiments, the operations sequence may be synthesized by merging two or more operations sequences (734).

In some exemplary embodiments, a portion of a first retained operations sequence and a portion of a second retained operations sequence may be identified. The portion of the first retained operations sequence may have a first ordered operation and a last ordered operation. The first ordered operation may be applicable in the current state and a last ordered operation may be configured to change the state of the computing device to an intermediate state. The portion of the second retained operations sequence may have a first ordered operation and a last ordered operation. The first ordered operation may be applicable in the intermediate state. In some exemplary embodiments, the last ordered operation of the portion of the second retained operations sequence may be configured to reach the target state. Additionally or alternatively, the last ordered operation may be configured to reach a second intermediate state and one or more additional operations sequences may be merged thereafter to reach the target state.

In some exemplary embodiments, the synthesized operations sequence may be based on a set of ordered operations sequences (or portions thereof). In some exemplary embodiments, the first operation in the set of ordered operations sequences which reaches the target state may be the last ordered operation of the synthesized operations sequence, even if consecutive operations may remain in the same state. Such cutoff may be useful to reduce the number of operations in the synthesized operations sequence, to increase likelihood of successful execution, and to increase efficiency in reaching the target state without performing redundant operations.

On Step 740, the synthesized operation sequence may be executed, thereby changing the state of the computing device as indicated by the user.

Figure 9:
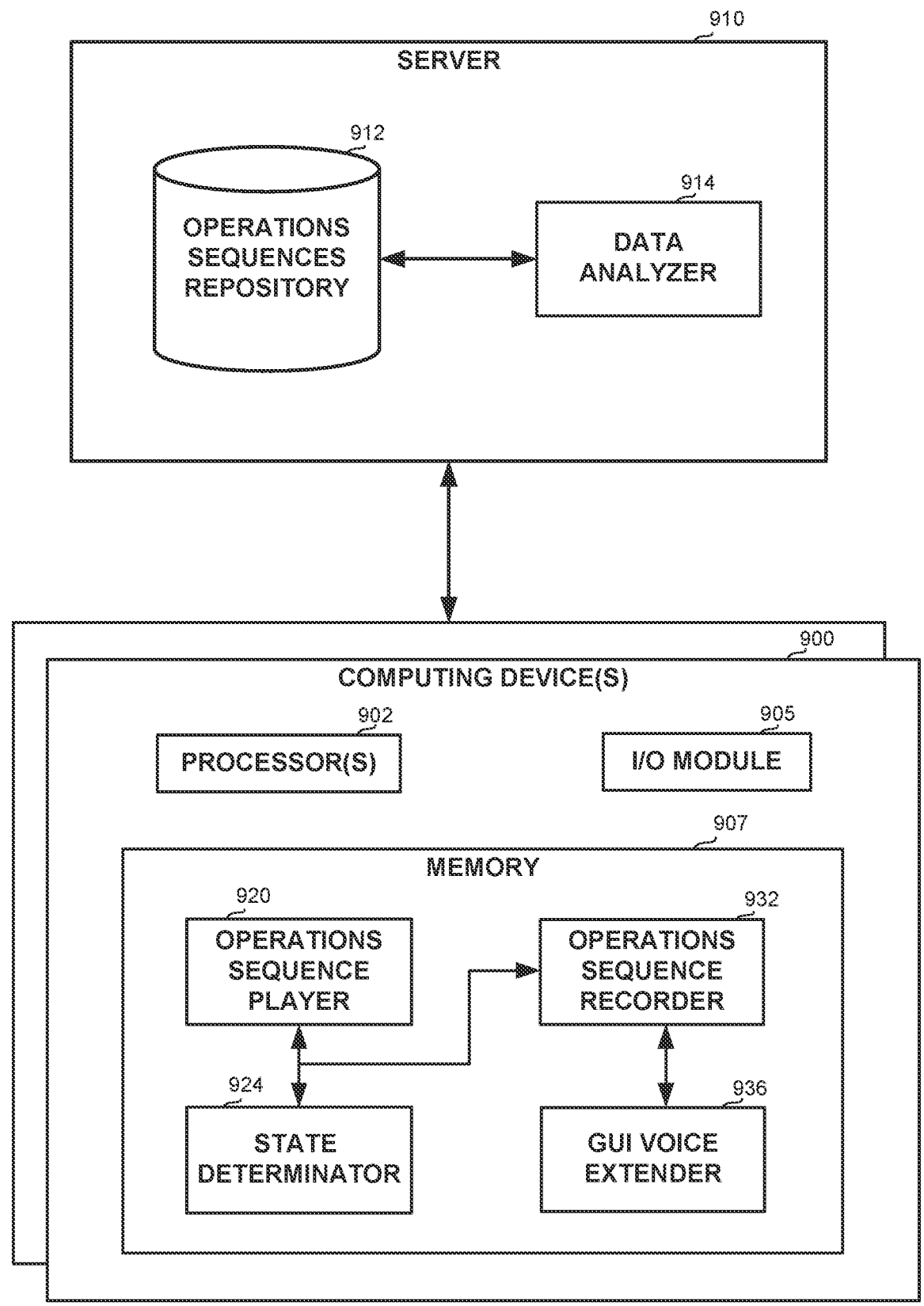
FIG. 9 shows a block diagram of a system, in accordance with some exemplary embodiments of the disclosed subject matter.

Referring now to FIG. 9 showing a block diagram of a system, in accordance with some exemplary embodiments of the disclosed subject matter.

A Computing Device 900 may be configured to provide for a recording of new operations sequences, execution of existing operations sequences, GUI modification, or the like, all, in accordance with the disclosed subject matter.

In some exemplary embodiments, Computing Device 900 may comprise a Processor 902. Processor 902 may be a Central Processing Unit (CPU), a microprocessor, an electronic circuit, an Integrated Circuit (IC) or the like. Processor 902 may be utilized to perform computations required by Computing Device 900 or any of it subcomponents.

In some exemplary embodiments of the disclosed subject matter, Computing Device 900 may comprise an Input/Output (I/O) Module 905. I/O Module 905 may be utilized to provide an output to and receive input from a user. In some exemplary embodiments, I/O Module 905 may be used to play audio to the user, such as via speakers, via headset, or the like. In some exemplary embodiments, I/O Module 905 may be used to provide a display to the user, such as using a screen display. In some exemplary embodiments, I/O Module 905 may be used to receive user commands, such as vocal commands via a microphone, commands using input devices such as a touch screen, a pointing device, a keyboard, or the like. In some exemplary embodiments, I/O Module 905 may be configured to communicate with Server 910.

In some exemplary embodiments, Computing Device 900 may comprise Memory 907. Memory 907 may be a hard disk drive, a Flash disk, a Random Access Memory (RAM), a memory chip, or the like. In some exemplary embodiments, Memory 907 may retain program code operative to cause Processor 902 to perform acts associated with any of the subcomponents of Computing Device 900.

Memory 907 may comprise an Operations Sequence Player 920. Operations Sequence Player 920 may be configured to execute an operations sequence. The operations sequences may be obtained from Server 910 or from another source. In some embodiments, the operations sequence may be retained locally in a local repository, which may or may not be updated periodically to reflect a portion of a remote repository that is accessible to Computing Device 900 and/or one or more users thereof.

Memory 907 may comprise a State Determinator 924. State Determinator 924 may be configured to determine a state of Computing Device 900. The state may be determined based on the executed application program that is running and is in a foreground of the display of Computing Device 900. Additionally or alternatively, the state may be determined by analyzing a layout of the GUI presented in the display of Computing Device 900. The determined state may be used to allow for transition from one state to another. In some exemplary embodiments, the transition from one state to another may be performed by Operations Sequence Player 920 in order to allow completion of execution of an operations sequence. Additionally or alternatively, the user may request to be transferred to a selected target state. The current state may be determined by State Determinator 924 to identify the current state from which an operations sequence should be executed to change the state as instructed.

Memory 907 may comprise an Operations Sequence Recorder 932. Operations Sequence Recorder 932 may be configured to record operations sequences. In some embodiments, the recordation may be performed based on explicit a-priori instruction by the user, based on the explicit post-factum instruction by the user, or implicitly and not based on user instruction. In some exemplary embodiments, Operations Sequence Recorder 932 may monitor execution of any user interactions with elements of a GUI of Computing Device 900. In some exemplary embodiments, Operations Sequence Recorder 932 may utilize State Determinator 924 to determine states in each recorded operation. In some exemplary embodiments, Operations Sequence Recorder 932 may monitor executions of operations sequences so as to collect usage statistics of each such sequence. The usage statistics may be retained locally on Computing Device 900 or transmitted to a server, such as Server 910.

Memory 907 may comprise a GUI Voice Extender 936. GUI Voice Extender 936 may be configured to modify a GUI to allow vocal instructions in accordance with the disclosed subject matter. GUI Voice Extender 936 may be configured to assign layout unique identifiers to each element of the GUI, thereby allowing the user to refer to the element vocally. GUI Voice Extender 936 may be configured to analyze speech to determine whether a vocal command provided is a command to execute an operations sequence, to record a new operations sequence, to change the state of Computing Device 900 to a target state, to interact with a GUI element, to read out loud content of a GUI element, or the like. In some exemplary embodiments, GUI Voice Extender 936 may be configured to echo the received vocal instruction to the user, thereby allowing the user to know how the Computing Device 900 interpreted her vocal command In some exemplary embodiments, GUI Voice Extender 936 may be utilized by Operations Sequence Recorder 932 to receive indications of operations to be recorded in an operations sequence.

Server 910 may be configured to retain operations sequences and make the sequences available for use by devices, such as Computing Device 900. Server 910 may comprise a processor (not shown), memory (not shown) and I/O module (not shown), similarly to Computing Device 900.

Server 910 may be updated from a plurality of computing devices, such as Computing Device 900, thereby aggregating information from a plurality of sources.

Server 910 may comprise an Operations Sequences Repository 912. Operations Sequences Repository 912 may be a repository retaining operations sequences. In some exemplary embodiments, Operations Sequences Repository 912 may comprise one or more assigned identifiers for each operations sequence. In some exemplary embodiments, Operations Sequences Repository 912 may retain usage statistics of each operations sequence, such as based on monitoring information provided from Computing Device(s) 900.

Server 910 may comprise a Data Analyzer 914. Data Analyzer 914 may be configured to analyze data in Operations Sequences Repository 912. In some exemplary embodiments, Data Analyzer 914 may be configured to analyze usage statistics, such as to determine most popular identifier per sequence (optionally, based on language or locale information), determine whether a user-defined sequence is safe for use by other users, determine when to make available a user-defined sequence to other users or to which group of users, determine whether a sequence that is available should become unavailable, such as based on a likelihood of the sequence being malicious sequence, based on a high failure rate of the sequence's execution, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by a computing device, wherein said method comprising:

obtaining an operations sequence, wherein the operations sequence comprises a first operation and a second operation, wherein the operations sequence is recorded while the first and second operations are performed by a user, wherein performing the first and second operations by the user comprises the user performing, via a Graphical User Interface (GUI), a first user interaction with a first element, and the user performing, via the GUI, a second user interaction with a second element, the first element is a clickable element, the first user interaction is a clicking interaction on the clickable element; and automatically executing the operations sequence or portion thereof on the computing device, wherein said automatically executing comprises:
in response to a determination that the first element is available in the GUI for user interaction in a first state of the computing device, automatically performing the first user interaction by automatically clicking, via the GUI, on the first element, whereby mimicking the first user interaction to cause, via the GUI, the first operation to be performed, whereby causing a current state of the computing device to change from the first state to a second state; and
in response to a determination that the second element is available in the GUI for user interaction in the second state, automatically performing the second user interaction, via the GUI, with the second element, whereby mimicking the second user interaction to cause, via the GUI, the second operation to be performed.

2. The method of claim 1, wherein said automatically executing comprises:
in response to a determination that the first element is unavailable for user interaction in a third state of the computing device:
obtaining an intermediary operations sequence, wherein the intermediary operations sequence comprises one or more operations, each operation representing a user interaction with an element of the user interface for operating the computing device, wherein the intermediary operations sequence is configured to cause the computing device to switch from the third state to the first state of the computing device;
performing the intermediary operations sequence or portion thereof to cause the computing device to switch from the third state to the first state, whereby allowing automatic execution of the first operation.

3. The method of claim 1, further comprising:
responsive to a determination that execution of the operations sequence cannot be completed automatically, prompting a user of the computing device to complete execution of the operations sequence;
monitoring operations of the user to determine an intermediary operations sequence; and
storing the intermediary operations sequence for future use.

4. The method of claim 1, wherein said obtaining the operations sequence comprises obtaining the operations sequence from a repository, wherein the repository comprising a plurality of operation sequences and usage statistics thereof.

5. The method of claim 1, wherein the operations sequence indicates that the first operation is immediately followed by the second operation, or vise versa.

6. The method of claim 1, wherein the second element is a second clickable element, the second user interaction is a clicking interaction on the second clickable element.

7. The method of claim 1, wherein the clickable element is a button widget, wherein the clicking interaction is clicking on the button widget.

8. The method of claim 1, wherein the GUI is configured to cause a clicking event to be triggered in response to a user clicking on the clickable element, wherein the GUI is configured to process the clicking event and to cause the first operation to be performed, wherein said automatically clicking, via the GUI, on the first element comprises generating the clicking event.

9. An apparatus having a processor, the processor being adapted to perform:
obtaining an operations sequence, wherein the operations sequence comprises a first operation and a second operation, wherein the operations sequence is recorded while the first and second operations are performed by a user, wherein performing the first and second operations by the user comprises the user performing, via a Graphical User Interface (GUI), a first user interaction with a first element, and the user performing, via the GUI, a second user interaction with a second element, the first element is a clickable element, the first user interaction is a clicking interaction on the clickable element; and
automatically executing the operations sequence or portion thereof on the computing device, wherein said automatically executing comprises:
in response to a determination that the first element is available in the GUI for user interaction in a first state of the computing device, automatically performing the first user interaction by automatically clicking, via the GUI, on the first element, whereby mimicking the first user interaction to cause, via the GUI, the first operation to be performed, whereby causing a current state of the computing device to change from the first state to a second state; and
in response to a determination that the second element is available in the GUI for user interaction in the second state, automatically performing the second user interaction, via the GUI, with the second element, whereby mimicking the second user interaction to cause, via the GUI, the second operation to be performed.

10. The apparatus of claim 9, wherein said automatically executing comprises: in response to a determination that the first element is unavailable for user interaction in a third state of the computing device:
obtaining an intermediary operations sequence, wherein the intermediary operations sequence comprises one or more operations, each operation representing a user interaction with an element of the user interface for operating the computing device, wherein the intermediary operations sequence is configured to cause the computing device to switch from the third state to the first state of the computing device;
performing the intermediary operations sequence or portion thereof to cause the computing device to switch from the third state to the first state, whereby allowing automatic execution of the first operation.

11. The apparatus of claim 9, wherein said processor being adapted to perform:
responsive to a determination that execution of the operations sequence cannot be completed automatically, prompting a user of the computing device to complete execution of the operations sequence;
monitoring operations of the user to determine an intermediary operations sequence; and
storing the intermediary operations sequence for future use.

12. The apparatus of claim 9, wherein the second element is a second clickable element, the second user interaction is a clicking interaction on the second clickable element.

13. The apparatus of claim 9, wherein the clickable element is a button widget, wherein the clicking interaction is clicking on the button widget.

14. The apparatus of claim 9, wherein the GUI is configured to cause a clicking event to be triggered in response to a user clicking on the clickable element, wherein the GUI is configured to process the clicking event and to cause the first operation to be performed, wherein said automatically clicking, via the GUI, on the first element comprises generating the clicking event.

15. A computer program product comprising a computer readable storage medium retaining program instructions, which program instructions when read by a processor, cause the processor to perform a method comprising:
  obtaining an operations sequence, wherein the operations sequence comprises a first operation and a second operation, wherein the operations sequence is recorded while the first and second operations are performed by a user, wherein performing the first and second operations by the user comprises the user performing, via a Graphical User Interface (GUI), a first user interaction with a first element, and the user performing, via the GUI, a second user interaction with a second element, the first element is a clickable element, the first user interaction is a clicking interaction on the clickable element; and
  automatically executing the operations sequence or portion thereof on the computing device, wherein said automatically executing comprises:
    in response to a determination that the first element is available in the GUI for user interaction in a first state of the computing device, automatically performing the first user interaction by automatically clicking, via the GUI, on the first element, whereby mimicking the first user interaction to cause, via the GUI, the first operation to be performed, whereby causing a current state of the computing device to change from the first state to a second state; and
    in response to a determination that the second element is available in the GUI for user interaction in the second state, automatically performing the second user interaction, via the GUI, with the second element, whereby mimicking the second user interaction to cause, via the GUI, the second operation to be performed.

16. The computer program product of claim 15, wherein said automatically executing comprises: in response to a determination that the first element is unavailable for user interaction in a third state of the computing device:
  obtaining an intermediary operations sequence, wherein the intermediary operations sequence comprises one or more operations, each operation representing a user interaction with an element of the user interface for operating the computing device, wherein the intermediary operations sequence is configured to cause the computing device to switch from the third state to the first state of the computing device;
  performing the intermediary operations sequence or portion thereof to cause the computing device to switch from the third state to the first state, whereby allowing automatic execution of the first operation.

17. The computer program product of claim 15, further comprising:
  responsive to a determination that execution of the operations sequence cannot be completed automatically, prompting a user of the computing device to complete execution of the operations sequence;
  monitoring operations of the user to determine an intermediary operations sequence; and
  storing the intermediary operations sequence for future use.

18. The computer program product of claim 15, wherein the second element is a second clickable element, the second user interaction is a clicking interaction on the second clickable element.

19. The computer program product of claim 15, wherein the clickable element is a button widget, wherein the clicking interaction is clicking on the button widget.

20. The computer program product of claim 15, wherein the GUI is configured to cause a clicking event to be triggered in response to a user clicking on the clickable element, wherein the GUI is configured to process the clicking event and to cause the first operation to be performed, wherein said automatically clicking, via the GUI, on the first element comprises generating the clicking event.

* * * * *